United States Patent [19]
Boothroyd

[11] 3,937,925
[45] Feb. 10, 1976

[54] MODULAR TRANSACTION TERMINAL WITH MICROPROCESSOR CONTROL

[75] Inventor: William A. Boothroyd, San Jose, Calif.

[73] Assignee: IBM Corporation, Armonk, N.Y.

[22] Filed: June 25, 1974

[21] Appl. No.: 482,860

[52] U.S. Cl. ..... 235/61.7 B; 340/149 A; 340/152 R; 340/172.5
[51] Int. Cl.² ..................... G06K 17/00; G06F 7/00
[58] Field of Search .......... 235/61.7 B; 340/61.6 R, 340/149 A, 152 R, 172.5

[56] References Cited
UNITED STATES PATENTS

| | | | |
|---|---|---|---|
| 3,705,384 | 12/1972 | Wehlberg | 235/61.7 B |
| 3,818,187 | 6/1974 | Lovendusky et al. | 235/61.7 B |
| 3,845,277 | 10/1974 | Voss et al. | 235/61.7 B |
| 3,852,571 | 12/1974 | Hall et al. | 235/61.7 B |

*Primary Examiner*—Daryl W. Cook
*Attorney, Agent, or Firm*—Fraser and Bogucki

[57] ABSTRACT

A versatile readily serviced transaction terminal includes a credit card control mechanism, a user keyboard, a user display, a document handling system for cash and printed transaction statements, and a system for controlling terminal operation. The terminal receives a user credit card having a magnetic stripe with prerecorded account information, reads the account information, and then receives a user personal ID number through the keyboard. As an available option, the terminal may require a predetermined correspondence between the personal ID number and the account information. After any required correspondence is satisfied, the user is permitted to operate the keyboard to indicate a selected one of an unlimited range of possible transaction requests. The control system, which includes a programmable microprocessor and a plurality of passive terminal elements interconnected by a terminal information bus, operates to assemble user supplied information, terminal status information, communicate transaction requests to a host, and provide central information to terminal modules for the execution of requested transactions in a manner consistent with host generated transaction reply messages. Each terminal element handles one or more terminal functions such as the control of hardware or the control of user communications in direct response to microprocessor control information. All decision making is handled by the microprocessor with only specific, well defined commands being executed by the bus connected modules.

20 Claims, 13 Drawing Figures

MODULAR TRANSACTION TERMINAL WITH MICROPROCESSOR CONTROL

CROSS REFERENCE TO RELATED APPLICATIONS

This application is related to the following patent applications with are concurrently filed herewith and assigned to the common assignee:

1. TRANSACTION EXECUTION SYSTEM WITH SECURE DATA STORAGE AND COMMUNICATIONS, Ser. No. 483,084, filed June 25, 1974, by Thomas G. Anderson et al.
2. TRANSACTION TERMINAL WITH UNLIMITED RANGE OF FUNCTIONS, Ser. No. 483,058, filed June 25, 1974, by William A. Boothroyd et al.
3. CONTACT SCAN CIRCUIT, Ser. No. 482,921, filed June 25, 1974, by William A. Boothroyd et al.

BACKGROUND OF THE INVENTION

1. Field of the Invention

This invention relates to transaction execution terminals which may issue cash, transfer funds, or execute other requested transactions and more particularly to transaction execution terminals having a microprocessor and modular subsystems which are interconnected by an information bus.

2. History of the Prior Art

Transaction execution terminals are currently available for the performance of extremely limited, specific transactions. For instance, cash issue terminals are available which will issue cash in return for the deposit of a check or the debiting of a credit card account. Such terminals typically require the insertion of a credit card containing account information written on a magnetic stripe and the keyboard entry of a personal ID number which corresponds in a predetermined manner to the credit card account information. The terminal then receives a requested dollar amount through a numeric keyboard and issues the desired amount of cash if the credit card and ID number are found to be in order.

Such terminals are able to perform only an extremely limited range of transaction functions and are not readily adaptable to the execution of additional functions. The systems for controlling terminal operation are relatively inflexible in nature and are able to perform only the limited range of available functions.

SUMMARY OF THE INVENTION

A transaction execution terminal in accordance with the invention includes a credit card control mechanism, a user keyboard, a user display, a document handling system including a cash issue mechanism and a transaction statement printing mechanism, and a modular control system. The modular control system, which controls all mechanical, electrical, and electromechanical terminal functions, includes a terminal information bus, a programmable microprocessor connected to the bus, and a plurality of passive terminal subsystems connected to the bus.

The terminal subsystems contain the functional actuators and sensors which are required to maintain terminal operation, but merely serve as a conduit for microprocessor commands without acting to make decisions themselves. The terminal elements operate in response to specific, well defined data signal commands to control the entry of information into function control registers, to accumulate terminal operating status information and present this information on the terminal information bus as terminal data on command.

The terminal actuators, whether they be motors, solenoids, relays, displays, or other devices, respond directly to stored terminal data information. For example, a DC motor for driving a credit card transport mechanism has the armature drive input thereto connected through two switches. The first is a single pole double throw switch which selectively connects the motor to a positive supply voltage or a negative supply voltage. The second is an on-off switch connected in series with the first switch. The first and second switches are responsive to first and second bit positions in a storage register, to selectively drive the motor in forward or reverse directions or turn the motor off in accordance with information written into the two bit positions by the microprocessor. Photocells are positioned at various points along the credit card transport path to detect a position of the credit card. When a photocell lightpath is interrupted by a credit card, a latch is set within the subsystem and an interrupt request is generated. The microprocessor processes the interrupt request by reading terminal status information accumulated by the subsystem to detect the photocell signal. If the credit card is to be stopped at this photocell, the logic O is then written into the second bit position of the function control register to terminate the motor operation. The terminal element thus plays no active decision making rule but merely serves a conduit to receive and execute clearly defined specific commands generated by the microprocessor.

This control system arrangement imparts to the transaction terminal and extremely precise but flexible control over the execution of requested transactions. The number of transactions which may be requested and executed are expandable without limit by merely modifying the program for the microprocessor and connecting any additional hardware that might be required to the terminal information bus. In addition, each terminal proprietor and owner may specify particular options for the processing of user transactions by merely inserting selected program options. No modification of the terminal hardware is required.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
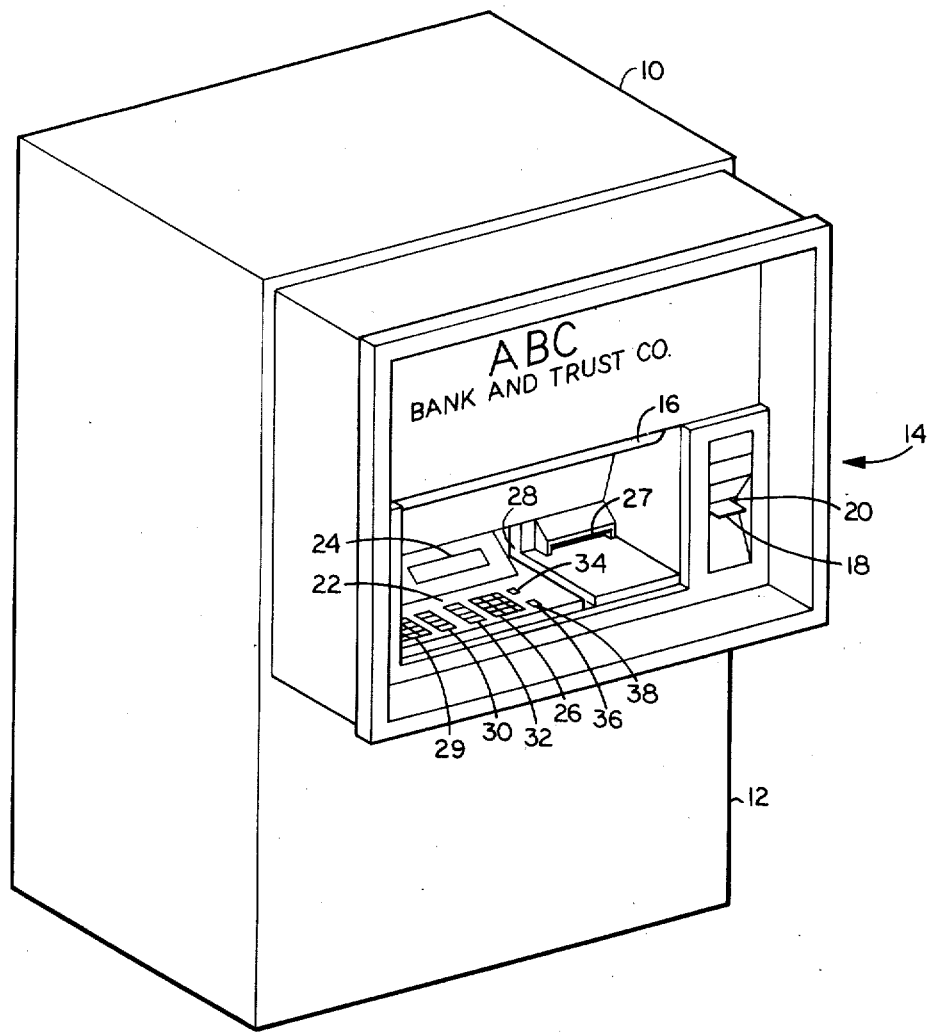
FIG. 1 is a perspective view of a transaction terminal in accordance with the invention.

A transaction terminal 10 in accordance with the invention includes an outer protective shell or cover 12, and a user panel 14. An access panel (not shown) at the rear of the machine permits access to an operator panel as well as access which is required for normal terminal maintenance such as the replenishment of bills and transaction statement forms and the clearance of any jam that might occasionally occur. A user panel door 16 is shown in a raised condition. The panel door 16 is normally closed to protect the user panel.

A user requested transaction is initiated by inserting a user credit card 18 having information recorded on a magnetic strip thereon through a credit card slot 20. A credit card transport system within the terminal 10 senses the presence of the credit card in the slot 20 and carries the credit card into the machine and past a read head to a temporary holding position. If the information read from the card 18 indicates that the terminal 10 is to process a transaction request related to that card, the panel door 16 is opened to make a keyboard 22, optical display 24, deposit flap 27, and a document issue slot 28 available to the user. The optical display 24 then instructs the user to enter his personal ID number through a numerical field 26 of keyboard 22. A six digit personal ID number is then entered through the keyboard. At the option of the owner of terminal 10, this number may be tested to correspond to information read from the credit card. The user is next directed by optical display 24 to indicate the type of transaction he wishes to request by activating a key within a function selection field 29 of keyboard 22. The user indicates the transaction type by a desired key, such as a withdraw key or a funds transfer key, within the function selection field 29. If the transaction requires, the user is then directed by the optical display to indicate the account from which funds are to be withdrawn or transferred by activating a key within a "from account" field 30 of keyboard 22. As typical examples the user might select a credit card account, a savings account or a checking account. If the transaction requires, the optical display next directs the user to select the account to which funds are to be transferred by activating a key within a "to account" field 32 of keyboard 22. The same accounts are typically available for selection by both the from account field 30 and the to account field 32. A withdraw transaction would of course require no key activation within the to account field 32 and the optical display 24 would direct the user to enter a dollar amount through the numeric field 26. Upon entry of the dollar amount, this amount is presented on optical display 24 and the user is requested to verify the amount by activating a "proceed" key 34 within a transaction control field 36 of keyboard 22. If the amount is incorrect the user may enter a new amount through the numeric field 26 or terminate the transaction by activating a cancel key 38 within control field 36. The canceled key may be activated at any time during the course of a transaction up to cash issue and causes the transaction to be cancelled with the credit card 18 being returned through slot 20 and the panel door 16 closing.

If the dollar amount is verified by an activation of the proceed key 34, the terminal 10 assembles the information read from the credit card and the information received through the keyboard 22 into a transaction request message which is communicated to a host data processing system. The host data processing system responds with a transaction reply message and also stores the transaction information for the terminal 10. Stored transaction information can then be used for updating user accounts in accordance with executed transactions. Alternatively, the host data processing system may be an on-line processing system with access to a large data base of storing user account information. In this case, the host data processing system, upon receipt of the transaction request message, would access the indicated user account files. The account information would be utilized to authenticate the user ID number and check for any restrictions such as overdrawn limits or cash withdrawn limits that might prevent execution of the transaction.

If the transaction is approved, a transaction reply message showing approval is communicated to the terminal 10 which responds by executing the requested transaction. This execution might involve the issuance of cash, the issuance of a transaction statement, the display of account information or simply an indication that the requested transaction had been executed. Upon execution of the transaction, the terminal 10 returns the credit card 18 through slot 20, closes the user panel door 16 and communicates a status message to the host data processing system to indicate that a transaction has been executed. This status message allows the host data processing system to close the transaction which opened with the transaction request message. The terminal 10 then awaits the insertion of a new credit card.

In order to further aid the user in selecting keys of the keyboard 22 which are to be activated, the keys within the function selection field 29, the from account field 30 and the to account field 32 are color coded and each contains a backlight. When a key is to be next activated in one of these fields 29, 30, 32, all of the backlights in the field are illuminated. When a key from this field is selected, the activated key remains backlighted to provide audit trail which is indicative of the requested transaction while all other backlights within the field are extinguished. The backlights and optical display are operated under program control to prompt a sequence of keyboard entry by the user which is consistent with a requested transaction and will not necessarily be the same for every requested transaction. For example, a funds transfer request would require the identification of an account through the to account field 32 while a cash issue request would not. Furthermore, a user may revise or change his transaction request by selecting a different key within a previously selected function select or account field 29, 30 or 32 by merely activating a different key. The process of entering the transaction request then continues from that revision point.

Figure 2:
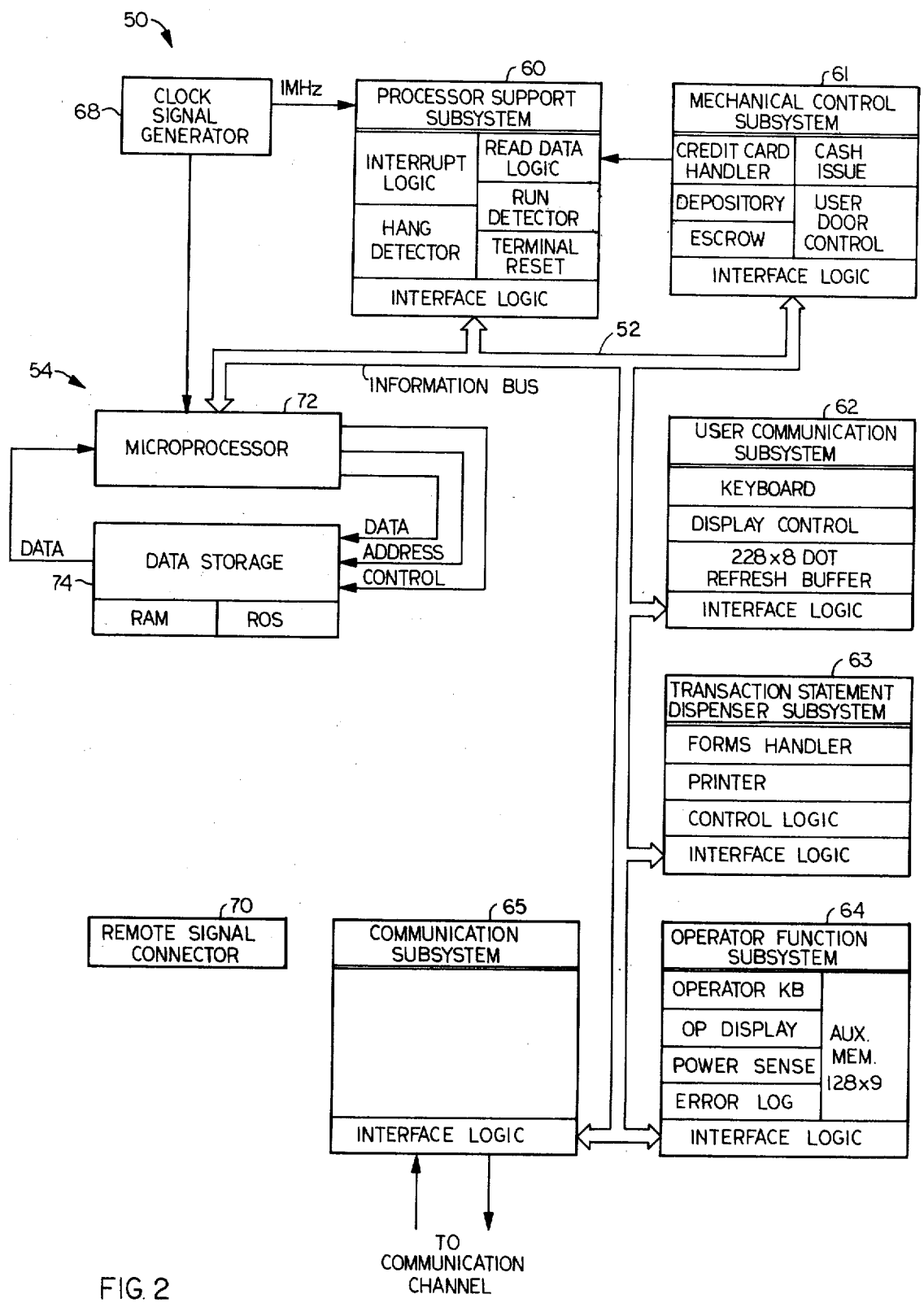
FIG. 2 is a block diagram representation of a function control system for the terminal shown in FIG. 1.

Referring now to FIG. 2, a terminal control system 50 for terminal 10 includes a terminal information bus 52, a programmable data processor 54 coupled via information bus 52 to a plurality of terminal adapters or elements 60–65. In general, the terminal elements 60–65 do not actively make any decision but merely act as a conduit for terminal data signals which are generated by the data processor 54 and communicated to control a driver circuitry for controlling the operation of actuators within the element. Each element also accumulates terminal status information which may be transferred along terminal information bus 52 to the data processor 54. A clock signal generator 68 generates a clock signal for the data processor 54 and a 1 MHz clock signal which is utilized by operational hardware or processor support subsystem element 60 for providing timing functions within terminal control system 50. A remote signal connector 70 allows a communication between the terminal 10 and a central control panel which may be used to monitor and control plurality of terminals similar to terminal 10. The remote control panel (not shown) may include lights to indicate when the terminal is opened, when a terminal is in use, when a cash low condition exists, when a forms out condition exists, or when an exception condition such as a document jam exists. Control switches available at the remote control panel permit the terminal 10 to be turned on or off, to be connected or disconnected from the communication line and to an internal communication function "wrap test." The remote control panel is a convenience which is not necessary to the operation of the terminal 10 and of course additional status or control functions could be assigned to the remote signal connector 70.

The data processor 54 includes an 8 bit parallel microprocessor 72 and data storage 74. The microprocessor 72 may be any conventional parallel processor. Data storage 74 includes read only storage (ROS) for the storage of fixed program and table information and random access storage (RAM) for the storage of scratch pad information, information which may be varied so as to select the desired options of each customer, display message text, optical character fonts and other information that may vary during the course of the operation of control system 50. The information retained by by the random access storage is lost each time the terminal 10 loses power and thus must be reinstated by an initialization image supplied by the host data processing system each time the terminal 10 goes from a power off to power on condition.

The terminal information bus 52 may be conventional in nature. The bus and the interface logic for controlling the transfer of information along the bus may be of the type described in U.S. Pat. No. 3,336,582 or U.S. Pat. No. 3,488,633. Other suitable bus and interface circuitry is described by the various makers of mini-computers. As described herein all data transfers are referenced with respect to the microprocessor 72. Thus, a write operation represents a data transfer from the microprocessor 72 to a subsystem element and a read operation represents a transfer from a subsystem element to the microprocessor 72.

While this invention is in no way dependent upon the exact nature of the terminal information bus 52 it will be presumed that the bus 52 includes nine data out-lines (8 bit + parity), nine data in-lines (8 bits + parity), control out-lines and control in-lines. Three mutually exclusive time periods are established by the control signals for the communication of bus information. At an address time, an address signal is generated by the microprocessor 72 to select one of the subsystem elements 60–65. At a command data signal time, command information is communicated from the microprocessor to a selected subsystem element. Finally, at data signal time terminal data may be either transferred on the data out bus to a selected subsystem element or on a data in bus from the selected element to the microprocessor 72. The direction of the terminal data transfer is dependent upon the nature of the preceding command data signal. Interrupt request generated by the subsystem elements 60–65 may also be communicated along the information bus 52.

Figure 3:
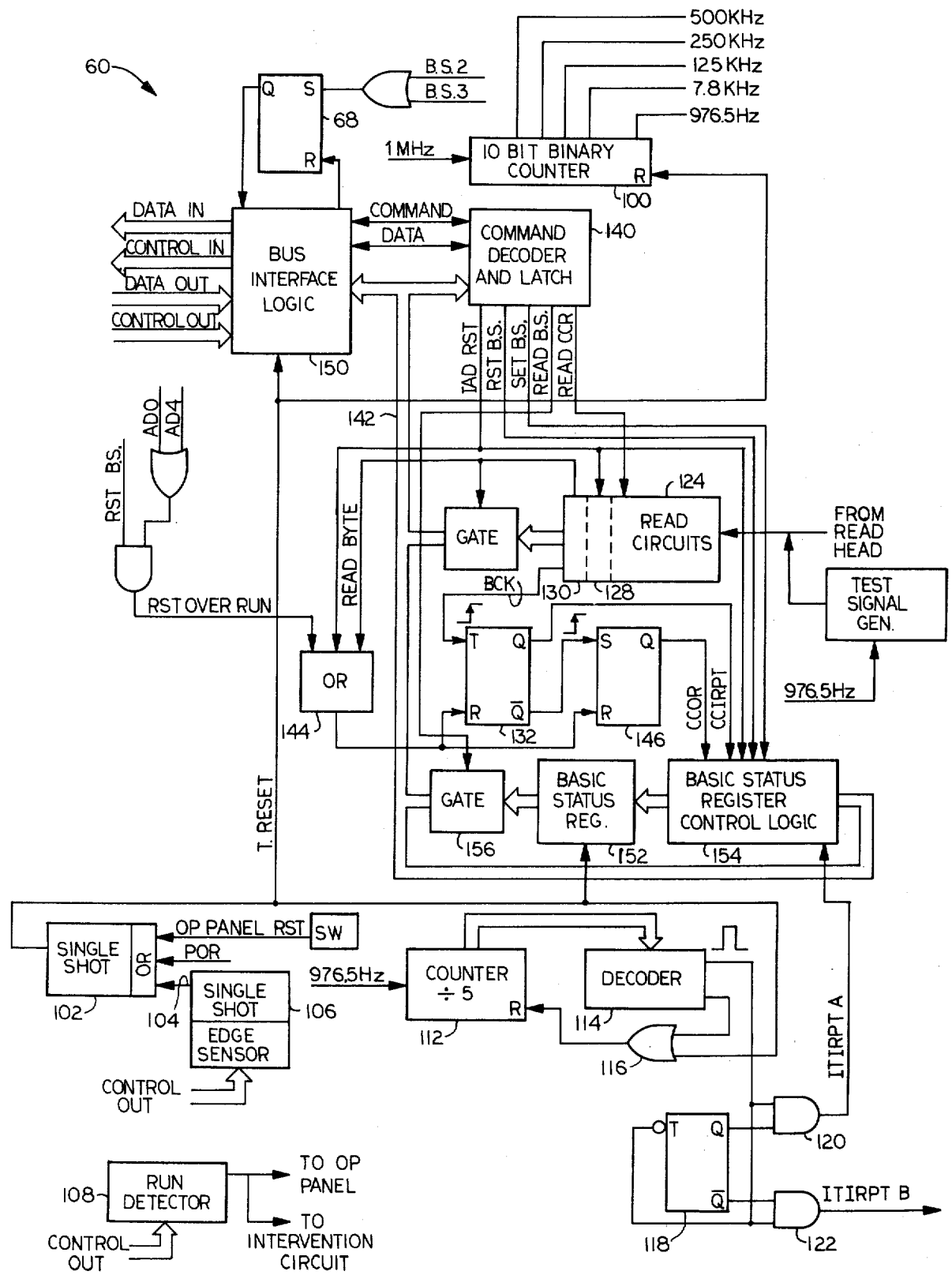
FIG. 3 is a block diagram representation of a processor support subsystem included within the control system shown in FIG. 2.

Referring now to FIG. 3, the processor support subsystem 60 operates as a logical extension of the microprocessor 72 by providing system control functions that are preferably implemented with hardware rather than software. One element of the processor support subsystem 60 is a 10 bit binary counter 100 which receives the one MHz clock signal from clock signal generator 68 and generates lower frequency clock signals which are used throughout the control system 50 for terminal 10. Counter 100 is resettable by a terminal reset signal which is also generated by the processor support subsystem 60. This terminal reset signal is generated by a single shot 102 which is activated in response to either a reset switch on the operator panel of the terminal or in response to a hangup signal 104 from a hang detector 106. The hang detector 106 is implemented as a single shot which provides an output on signal line 104 only after a period of time $\Delta T$ following the triggering of the single shot. The single shot is connected to be triggered in response to activity on the control out portion of the terminal information bus lines 52. Thus, each time there is activity on the data bus that causes activity, the single shot of hang detector 106 is triggered to reset the delay time $\Delta T$. Delay time $\Delta T$ is chosen to be on the order of 0.5 seconds so that the time is extremely long with respect to the normal time between the bus activity but yet relatively short from the point of view of a person using the terminal 10. The hang detector 106 causes the microprocessor 72 to reset to a predetermined program instruction in the event that an unrecoverable error conditions causes interruption of the normal program execution. For example, as a result of an error occurring as data is transferred from the data storage, or memory 74, to the microprocessor 72, an instruction received by the microprocessor 72 may contain an operation code which is meaningless to the microprocessor 72 and which does not permit the microprocessor to continue the execution of instructions. In the event that such an error occurs, the microprocessor merely comes to a complete halt. Normally some kind of operator intervention would then be required. However, the hang detector 106 detects the lack of any bus activity and generates an output signal on line 104 which causes a single shot 102 to generate a terminal reset signal. The terminal reset signal causes the microprocessor 72 to fetch an instruction from a predetermined location in data storage 74 which permits the microprocessor 72 to restart normal operation if further unrecoverable errors do not occur. Terminal reset signal is also carried by information bus 52 to other subsystems which are connected to the bus and utilized to reset registers and latches within the other subsystems where appropriate. The terminal reset signal generating single shot 102 is responsive to power on reset from power sensor 874 (FIG. 13) and to a switch that may be located on an operator panel as well as to the hang detector 106. The customer is thus given the option of resetting terminal 10 manually at any time even though a manual reset is not required to permit recovery by the microprocessor 72 from what would normally be an unrecoverable error. Other signals as appropriate for various microprocessors may of course be monitored to drive the hang detector 106. For example, the control lines, the address lines, or even the data lines which connect the microprocessor 72 to the data storage module 74 might be monitored. If the microprocessor 72 is working properly, it must execute memory fetch cycles at regular intervals and monitoring of these memory control and data signals would permit a determination of whether the memory fetch cycles are occurring. In addition, some data processors have an output signal which drives a panel indicator to indicate whether or not the processor is executing instructions. This signal could of course be monitored by the hang detector 106 where available.

A run detector 108 also monitors the control out signals on the information bus 52 and is connectable to drive an indicator light on an operator control panel and also which indicates that the terminal 10 is operating satisfactorily. Run detector 108 monitors signal transitions the same as hang detector 106 except that the output of run detector 108 is active so long as microprocessor 72 is operating in a normal (non-error) manner while the output of hang detector 106 becomes active when microprocessor 72 ceases to operate. The output of run detector 108 is also communicated to an intervention relay which is connectable to drive an intervention required indicator light on the remote customer control panel whenever the output of run detector 108 becomes inactive or whenever a control signal which turns on the main power to the electromechanical actuators of terminal 10 becomes inactive. The intervention required relay is also controllable by the microprogram via mechanical control subsystem 61, thus providing means for either the microprogram or host via microprogram to indicate system detected errors. The intervention required remote control indicator light thus indicates an exception condition for terminal 10, which typically needs operator intervention.

Processor support subsystem 60 also generates interrupt requests at 10.24 msec. intervals to provide microprocessor 72 a time base to permit the timing of various operations associated with the terminal 10. The interrupt generating circuitry includes a counter 112, decoder 114 and OR gate 116 driving a reset input to counter 112, a toggling flipflop 118 and a pair of AND gates 120, 122. The counter 112 receives a 976.5 Hz signal from counter 100 and operates in conjunction with decoder 114 to count by five. Decoder 114 senses a count of five to activate the reset input to counter 112. Counter 112 thus actually goes through six count states (0–5) but because count state 5 and count state 0 occurs within the same count pulse cycle it functions as a divide by 5 circuit. OR gate 116 also responds to the terminal reset signal to reset counter 112. Decoder 114 also generates a short output pulse upon detection of count 5. This output pulse drives flipflop 118 as well as AND gates 120 and 122. As the pulse output from decoder 115 goes high, one of the AND gates 120, 122 becomes enabled, dependent upon the state of flip-flop 118. As the pulse goes low, the AND gates 120, 122 are disabled and the flipflop 118 is toggled by the falling edge. AND gate 120 thus generates a signal A having short duration pulses which occur at 10.24 msec. intervals. Similarly, AND gate 122 generates an output signal B having short duration pulses which also occur at 10.24 msec. intervals except that signals A and B have an offset phase relationship.

Read circuitry 124 within the processor support subsystem 60 receives the signal from the read circuitry 124 and includes conventional amplification and logic detection circuitry for reading information which is stored on a magnetic card stripe in a conventional double frequency binary format. However, it should be noted that read circuitry 124 includes an 8 bit accumulation register 128 and an 8 bit buffer register 130. Data is accumulated in the 8 bit accumulation register 128 in bit-by-bit serial fashion. After the accumulation register 128 is loaded, a buffer clock signal (BCK) is generated to transfer the contents of the accumulation register 128 in parallel to a buffer register 130. The clock signal BCK simultaneously is utilized to toggle a flip-flop 132 from the reset state to the set state to cause the generation of a credit card interrupt signal at the Q output therefrom. This signal causes the generation of a processor support subsystem 60 interrupt request. As the microprocessor 72 processes the interrupt request, it addresses the processor support subsystem 60 and causes a read CCR signal to be generated by a command decoder and latch 140. The read circuits 124 respond to the read CCR command by generating a read byte signal which simultaneously gates the parallel contents of buffer register 130 onto a processor support subsystem data bus 142 and activates an OR gate 144 to simultaneously reset toggling flip-flop 132 and an SR flip-flop 146. If, however, the buffer register 130 is loaded and then the accumulation register 128 becomes completely reloaded before the contents of the buffer register 130 are read by microprocessor 72, the buffer clock signal, BCK, is still generated causing the contents of the accumulation register 128 to be transferred to buffer register 130. When this happens, the original contents of buffer register 130 are lost and it becomes impossible for the microprocessor 72 to acquire all of the information from the magnetic stripe of the credit card without requesting reinsertion of the card. When the original information was loaded into buffer register 130, signal BCK caused flip-flop 132 to toggle to the set state. The subsequent signal BCK which causes buffer 130 to overflow, toggles flip-flop 132 back to the reset state. The $\overline{Q}$ output of flip-flop 132 drives the set input to flip-flop 146 to generate a credit card overrun signal, CCOR, at the Q output of flip-flop 146. Normally, the output of OR gate 144 generates the resetting signal which resets both flip-flop 146 and flip-flop 132. However, when flip-flop 132 is toggled by BCK back to the reset condition, the reset signal to flip-flop 146 is not present and flip-flop 146 is permitted to enter the set state.

Each of the subsystems 60–65 includes a certain amount of standardized circuitry that is repeated for each of the subsystems. This standardized circuitry includes bus interface logic 150, data bus 142, command decoder and latch 140, an 8 bit basic status register 152, basic status register control logic 154, and an output gate 156 for basic status register 152. Bus interface logic 150 is connected to the control and data lines of information bus 52 and includes the circuitry which is necessary for transferring information over terminal information bus 52. This circuitry is conventional in nature and is therefore not described in detail herein. In general, the bus interface logic 150 handles the receipt and generation of signals which permit microprocessor 72 to be assured that data transfers are accomplished without error. It will be appreciated by those skilled in the art that the requirements of the bus interface logic 150 will be in large determined by the particular microprocessor chosen for 72.

More specifically, the bus interface logic 150 recognizes the presence on the terminal information bus 52 of an address signal corresponding to a predetermined address and thereafter acts during a subsequent command time to gate the data out lines of terminal information bus 52 to the data lines of data bus 142. A command signal is sumultaneously outputted to command decoder and latch 140 which causes the command decoder and latch 140 to decode the information on subsystem data bus 142 and to generate a single subsystem command control signal. This command control signal is latched as the signal command is removed by the bus interface logic 150. It will be appreciated that each of the subsystems 60–65 includes a command decoder and latch such as command decoder and latch 140. It should be further appreciated that while all of the command decoder and latches operate in similar manner, the decoder circuitry and number of latchs will depend upon the control commands and predetermined binary data combinations which are selected to indicate commands. The command decoder and latch 140 thus contains five latches to store and decoder circuitry for recognizing each of five predetermined information signals which indicate the commands. Bus interface logic 150 also responds by connecting the data out lines of terminal information bus 52 to the subsystem data bus 142 for a write command and connecting the data in lines of terminal information bus 52 to the subsystem data bus 142 for a read command with the command decoder and latch 140 outputs having established the proper gate signals to select the proper source for the data transfer.

Thus, if the preceding command were a read CCR command, during the time that signal data is active the read CCR command is output to read circuits 124 which respond by generating the read byte command signal which gates the contents of buffer register 130 onto subsystem data bus 142 and also the data in lines of terminal information bus 52 to make the contents of buffer register 130 available to microprocessor 72. Read byte signal simultaneously resets flip-fllps 132 and 146 as explained previously. If the previous command from the microprocessor 72 had been a read basic status register command, the command decoder and latch 140 responds to the signal data by outputting a command control signal read B.S. which gates the contents of basic status register 152 onto subsystem data bus 142 and the data in lines of terminal information bus 52. The remaining commands which are applicable to processor support subsystem 60 are executed in a similar manner. A set basic status command is actually a write command for which information generated on the data out bus lines is communicated to the subsystem data bus 142. As the set B.S. command control signal is generated, the individual basic latches of the basic status register 152 are set in accordance with a processor support subsystem 60 status signal only if the line of subsystem data bus 142 (ADB0 through ADB7) which corresponds to a particular latch contains a logic 1. Any latch which corresponds to a subsystem data bus line carrying a logic 0 remains unchanged. A reset basic status command operates in a similar manner except that a basic status register latch corresponding to a bus line carrying a logic 1 is reset independent of the subsystem status information which the latch is connected to represent. The IAD reset signal is a command signal which is applicable only to the processor support subsystem 60 and permits a resetting of processor support subsystem 60 without resetting the microprocessor 72 or any of the other subsystems in the terminal 10.

Latch 0 of basic status register 152 is connected to indicate the generation of the credit card interrupt signal, CCIRPT, by flip-flop 132. Latch 0 has the set and reset commands respectively controlled by the signals:

SET BS0 = CCIRPT·$\overline{READ\ B.S.}$+ADB0·SET B.S.
RST BS0 = IAD RST+ADB0·RST B.S.+RESET Basic Status Latch 1 is the interval timer interrupt latch and has the set and reset inputs respectively driven by the logical functions:

SET BS1 = ITIRPTA·$\overline{READ\ B.S.}$+ADB1·SET B.S.
RST BS1 = IAD RST+ADB1·RST B.S.+RESET Latch 2 has not assigned significance. Latch 3 is used to selectively inhibit the 10.24 msec. interrupt signal from generating an interrupt request. The control inputs are:

SET BS3 = ADB3·SET B.S.
RST BS3 = IAD RST+ADB3·RST B.S.+RESET

Latch 4 is the credit card overrun latch and is set and reset in accordance with the respective logical functions:

SET BS4 = CCOR·$\overline{READ\ B.S.}$+ADB4·SET B.S.
RST BS4 = IAD RST+ADB4·RST B.S.+RESET Latches 5 and 6 are not implemented.

Latch 7 is the interrupt request latch and a logic 1 output indicates a pending interrupt request. The output of latch 7 is connected to gate 156 along with the outputs of the other latches but is also connected directly to the bus interface logic 150 on a line (not shown) which bypasses gate 156. Bus interface logic 150 responds to this bit 7 signal by communicating an interrupt signal to microprocessor 72 via terminal information bus 52. Latch 7 is set concurrently with latches 0, 1 and 4 and is set and reset in accordance with the respective logic functions:

SET BS7 = (ITIRPTA+CCOR+CC1)·$\overline{READ\ B.S.}$+AD7·SET B.S.
RST BS7 = ADRST+AD7·RST B.S.+RESET The signals ADB0–ADB7 indicate the separate bit signals on the subsystem data line 142 and permit the selective loading and resetting of each individual basic latch in the basic status register 152.

MECHANICAL CONTROL SUBSYSTEM

Figure 4:
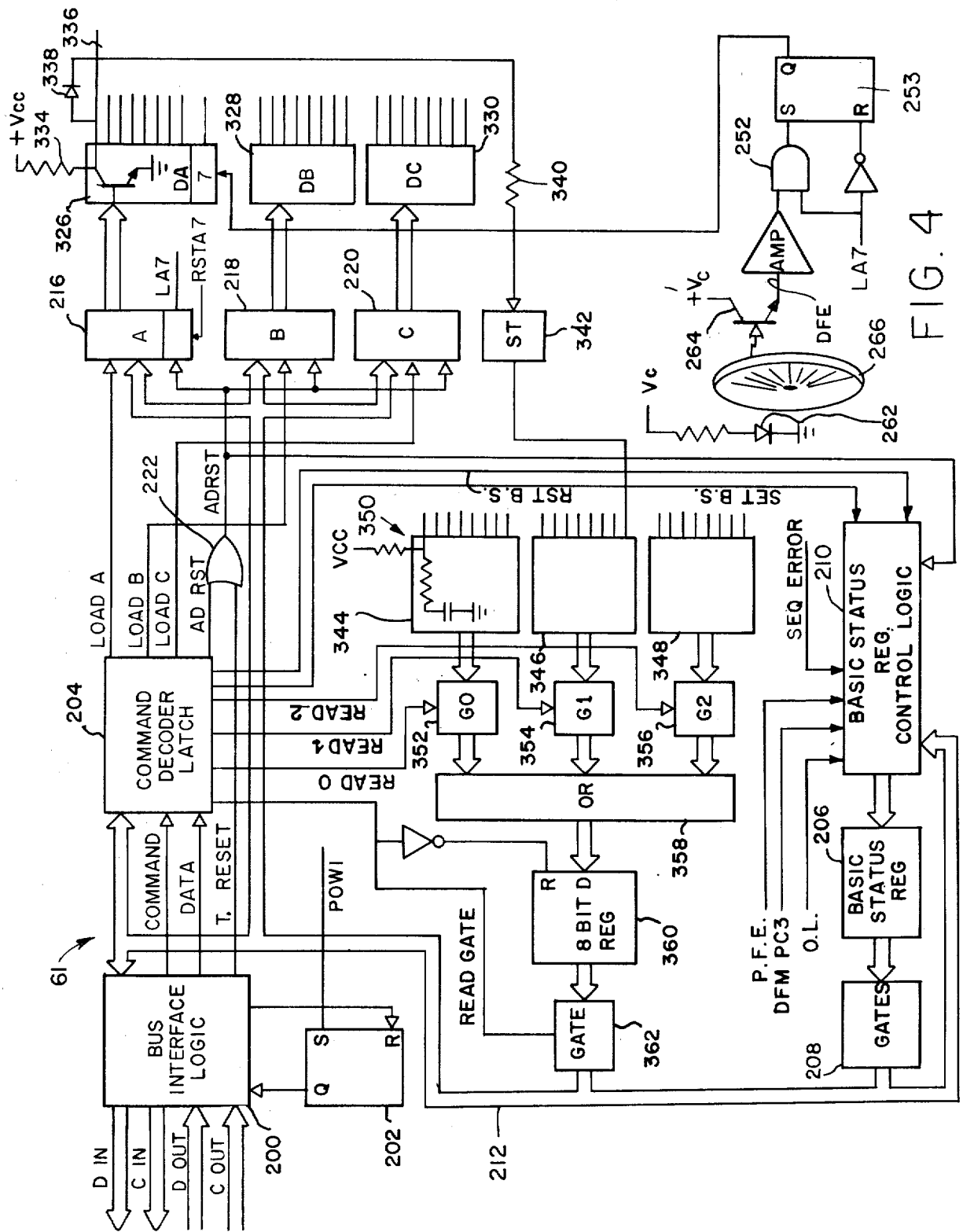
FIG. 4 is a block diagram representation of a mechanical control subsystem included within the control system shown in FIG. 2.

Reference is now made to FIGS. 4–10 and more particularly to FIG. 4 which shows the logic portion of the mechanical control subsystem 61 of the control system 50 for terminal 10. The circuitry included within the mechanical control subsystem 61 which is similar in nature to circuitry within each of the subsystems 60–65 includes bus interface logic 200, an interrupt request flip-flop 202, a command decoder and latches 204, a basic status register 206, an output gate 208 for basic status register 206, basic register control logic 210 and a subsystem data bus 212. These circuits operate in a manner as described in conjunction with the processor support subsystem 60 except that command decoder and latch 204 responds to control commands which are particularly related to the mechanical control subsystem 61 and the terminal status input to the basic status register control logic 210 are unique to the mechanical control adapter 61. In addition to decoding and latching three read commands, read 0, read 1, and read 2, three write commands, load A, load B and load C, a subsystem reset command CADRST, a set basic status command, and a reset basic status command, the command decoder and latches 204 generates a read gate signal concurrently with the outputing of a read 0, read 1 or read 2 command during the data time.

The mechanical control adapter 61 executes direct and specific instructions from microprocessor 72 to control the operation of the mechanical equipment required to operate the terminal 10. The individual command signals for the operating hardware are stored in three 8 bit registers A 216, register B 218 and register C 220. All three registers are connected to be reset by a reset signal ADRST generated by an OR gate 222 as the logical OR of a terminal reset signal, T. RESET, or a mechanical control subsystem reset control command, CADRST. The data input to the 8 bit positions of register A 216, register B 218, and register C 220 are coupled respectively to the eight corresponding lines of subsystem data bus 212. The clock input of the register which causes the contents thereof to assume the data state of information appearing on bus 212 are coupled respectively to command control signals from command decoder and latches 204 load A, load B and load C.

Figure 5:
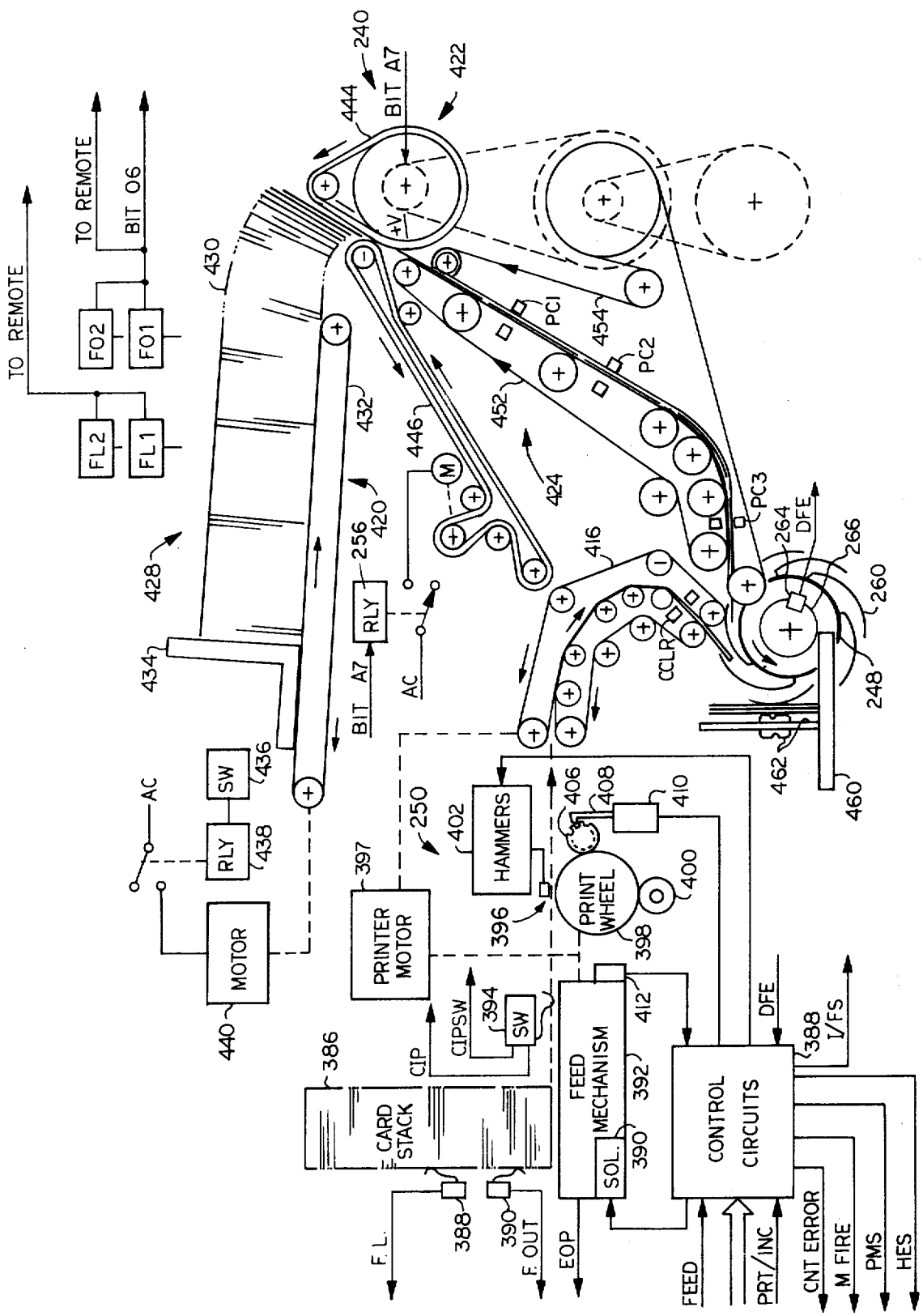
FIG. 5 is a side view representation of a document handling system included within the mechanical control subsystem shown in FIG. 4.
Figure 6:
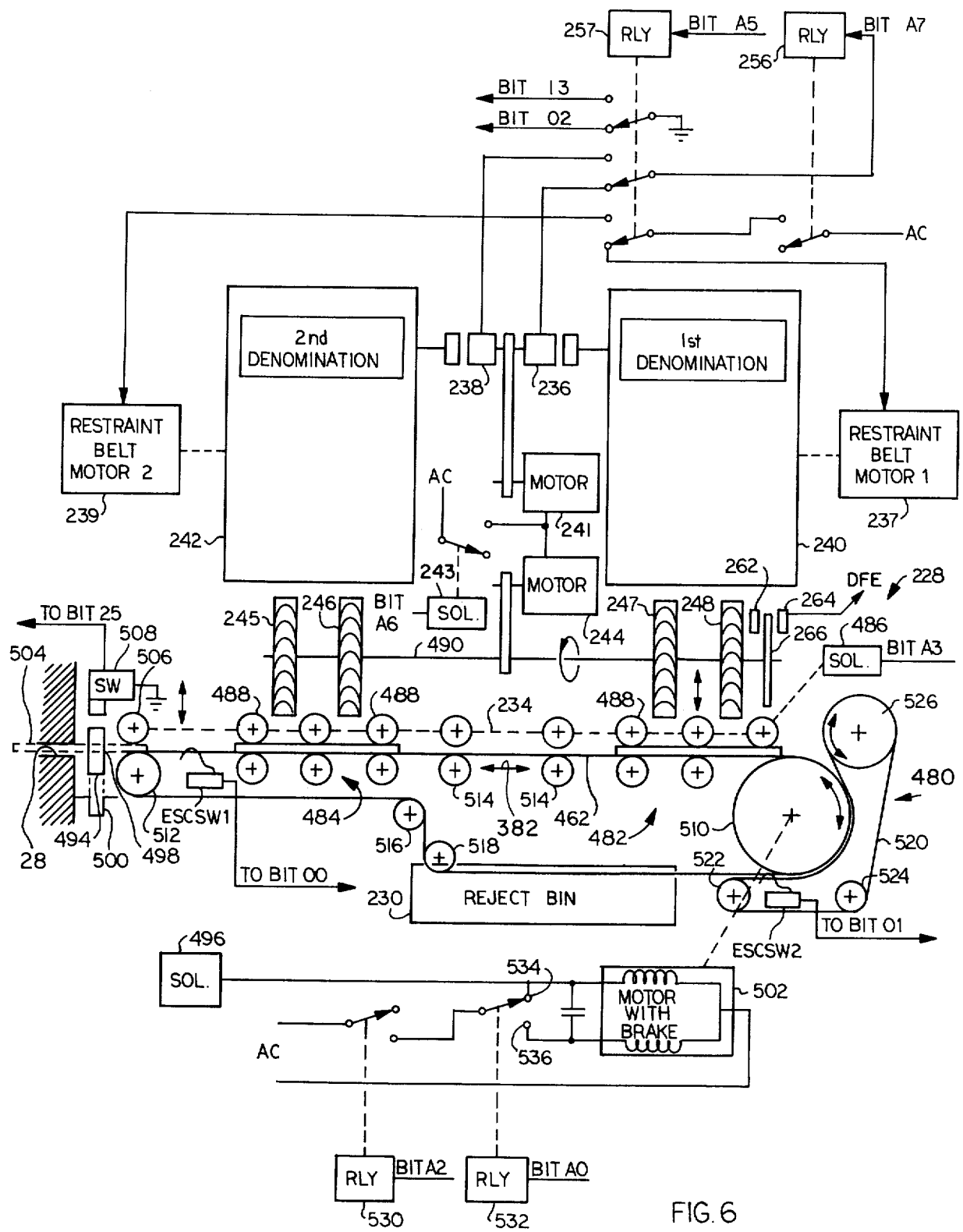
FIG. 6 is a rear view represenation of a document handling system shown in FIG. 5.

Bit 0 of register A controls the direction of operation of a credit card transport mechanism 226 (FIG. 9) and an escrow transport mechanism 228 (FIG. 6). This bit position does not control the turning on and off of the mechanism but only the direction of travel when the drive motors are turned on by other bit position control signals. A logic 1 in register A bit 0 establishes direction control such that if the motors were running a credit card would be transported into terminal 10 by transport mechanism 226 or a document held in escrow would be transported toward a reject bin 230 by a document escrow transport system 228. Register A bit 1 controls the energization of the motor for the credit card transport mechanism 226 whereby a logic 1 will cause the motor to be turned on. Register A bit 2 controls the activation of a motor which drives the escrow transport system 228 whereby a logic 1 will cause the motor to be energized. Register A bit 3 controls the activation of an escrow clamp mechanism 234. A logic 1 causes an escrow clamp mechanism to be energized to hold the contents of escrow in a transport position. A logic 0 causes claim 234 to be released to permit the loading of additional documents into escrow. Register A bit 4 is not assigned. Register A bit 5 determines which of a pair of bill feed clutches 236, 238 for cash issue or document feed mechanisms 240, 242 respectively may be activated. A logic 1 selects a clutch 238 for a second document feed mechanism 242 and a logic 0 selects clutch 236 for first document feed mechanism 240. Register A bit 6 is a power on control bit and when set to logic 1 energizes a solenoid 243 which makes power available to motors 244, 241 which drive stacker wheels 245–248 and document transport mechanisms for the document feed mechanisms 240 and 242. This bit position also controls relays which make AC power available to a transaction statement printing mechanism 250 (FIGS. 5 and 12) and high voltage DC power available to the user guidance display 24. Register A bit 7 controls the activation of whichever feed clutch 236 or 238 was selected by bit A5. This bit when set to logic 1 allows the energization of the clutch and is reset when the first photocell PC1 (FIG. 5) detects the feeding of a bill. The stacker wheels 245–248 contain serpentine tines 260 at the periphery thereof which receive and guide issued documents. A light emitter 262 and photosensor 264 operate in conjunction with an indexing wheel 266 (FIGS. 4, 5, and 6) which rotates with the stacker wheels 245–248 to provide an output signal to AND gate 252 whenever a document which if fed at that instant will reach the stacker wheel at the appropriate time to enter between two adjacent serpentine tines 260. The output of AND 252 is used to set latch 253 which in turn activates bit A7 of driver 326 which actually drives the clutch. Register A bit 7 is unique in that it is connected to be reset by a signal RSTA7 which occurs as soon as the feeding of a bill from a selected document feed mechanism is complete. The signal RSTA7 turns off register A bit 7 which in turn resets latch 253 to deenergize driver A7 and thus the selected clutch. This unique reset signal RSTA7 is utilized because the timing for deactivating the clutch 236 or 238 is too critical to wait for microprocessor 72 to sense the feeding of a bill and then load a 0 into register A bit 7. The output of the clutch driver, Driver A7, is also used to control relay 256 to energize restraint belt drive motors 237, 239 only when a corresponding clutch 236,238 is energized as defined by the activation of relay 257 by bit A5.

Figure 9:
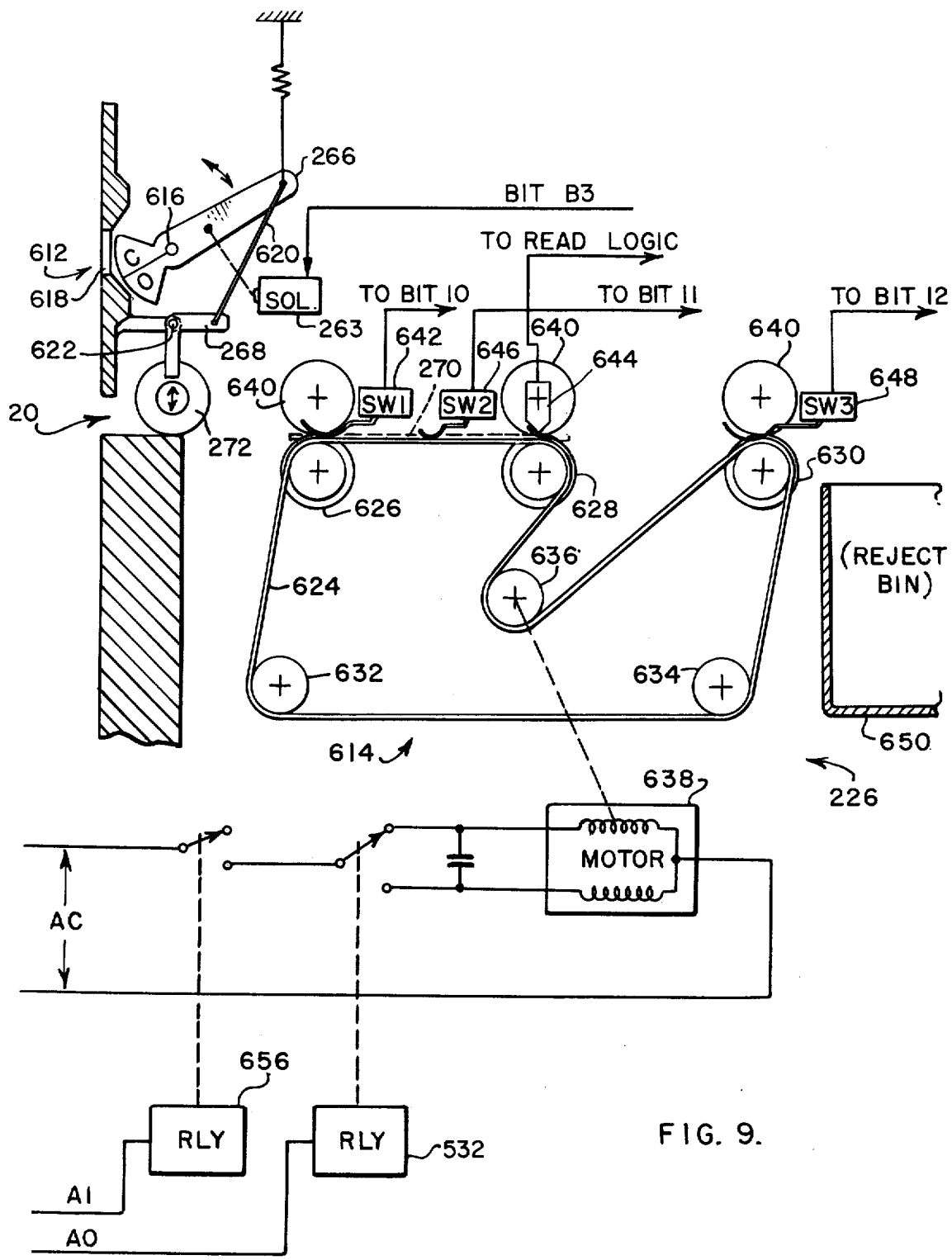
FIG. 9 is a block diagram, schematic representation of a card handling mechanism for the mechanical control subsystem shown in FIG. 4.
Figure 10:
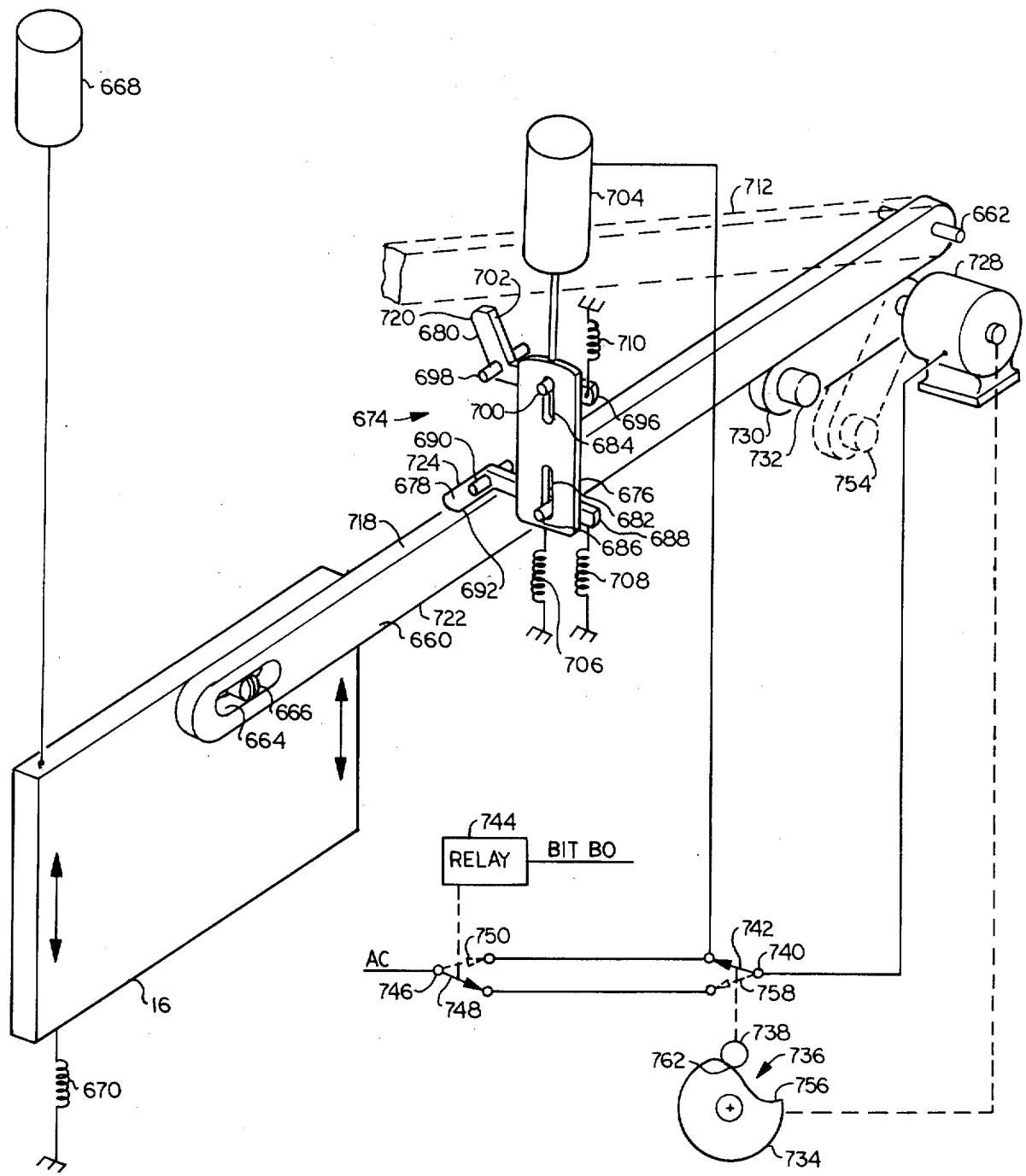
FIG. 10 is a block diagram, perspective representation of a panel door mechanism included in the mechanical control subsystem shown in FIG. 4.

Bit 0 of register B controls the operation of user door 16 (FIG. 10). When this bit is set to a 1, the user door is opened, when set to a 0 the door is closed. Bit position 1 and 2 of register B are unassigned. A 1 in bit position 3 of register B activates a solenoid 263 which drives an open/close indicator 266 (FIG. 9) to an open position and a detent 268 to a release position to permit entry of a user credit card 270 past a blocking roller 272. A logic 1 at bit 4 of register B activates a deposit mechanism 274 (FIG. 8) by energizing a motor 276 which drives a deposit transport mechanism and unlocks a flap 278 which blocks the deposit entry 27. Bit 6 of register B drives an attention required relay which is logically ORed with a run signal from a process support subsystem 60 to provide a contact set which can be used to drive an indicator light on a remote control panel to indicate that attention is required by the terminal 10. The relay and driver are arranged such that power must be available to the relay and a logic 1 must be stored at bit 6 of register B in order to prevent the activation of the attention require signal at the remote control panel. Bit position 7 of register B is unassigned as are all bit positions of register C.

Corresponding to each of the registers 216, 218 and 220 are eight bit drivers, driver DA 326, driver DB 328, and driver DC 330. As illustrated by way of example for bit position A0, each of the drivers outputs is a grounded emitter, open collector NPN transistor 232. The base of each transistor is connected through a suitable predriver stage to a Q output of a corresponding latch in the control registers 216, 218 and 220. The collector of each driver transistor 332 is connected through a resistor 334 to a positive voltage supply, and to an output control line 336 from the driver, and to a diode 338. The cathode of each diode 338 is connected to a common resistor 340 in series with the input of a Schmidt trigger 342. The output of Schmidt trigger 342 is fed to a driver wrap test bit 17 in the status input circuit 346.

The Schmidt trigger 342, together with diodes 338, acts as a negative input OR gate in that it generates a logic 1 output signal in the event that any of the driver transistors 332 are not on. This relationship permits use of the driver wrap bit, bit 17, to test the drivers. First, all of the drivers are turned on simultaneously, then if all drivers properly turn on, a logic 0 should be read from the driver wrap bit. Thus, a malfunctioning open driver would be detectable. Next, the drivers are tested for shorted drivers by turning on all but one driver. If the driver wrap bit goes to logic 1 the driver is properly turning off because it is known that all drivers are properly turning on and only the driver under consideration has been commanded to turn off, and in fact is off. This test is repeated for all drivers. The resistor 334 insures a logic 1 output for unconnected drivers while being sufficiently large in magnitude to have substantially no effect on connected drivers. This eliminates the need for many special tests dependent on features installed in a given machine. The drive wrap test need not have any effect upon terminal operating hardware mechanisms because the relays and solenoids which control these mechanisms operate relatively slowly in comparison to the speed at which the drivers may be turned on and off during the course of a driver wrap test.

Status input circuit 344 contains eight RC input circuits of which only input circuit 350 is shown by way of example. These input circuits 350 serve as low pass filters to reduce switch bounce or other high frequency noise on inputs thereto. Inputs circuits 346, 348 are similar to input circuit 344 and each include RC input networks 350.

Gates 352, 354 and 356 permit the gating of one of the status circuits 344, 346 or 348 to an OR gate 358 in response to a read 0 command, read 1 command or read 2 command respectively. A reset signal is generated as the complement of a gate signal and normally holds the contents of an 8 bit latch 360 in a reset condition. However, as one of the read command signals 0-2 goes active during the data time, the read gate signal is activated to terminate the reset signal to register 260 and enable a gate 362 which passes the contents of read register 360 on to the subsystem data bus 212. As the reset signal for register 360 goes inactive the eight latches are permitted to assume the respective states of the eight signals which are transferred through OR gate 358 from one of the gates 352, 354 or 356 depending on which read command is executed. It is thus possible to selectively load 24 drivers by setting bits in registers 216, 218 and 220 and to selectively read 24 bits of subsystem status information by selectively sampling the status of the three data input circuits 344, 346 or 348.

The inputs to the subsystem status circuitry 344, 346 and 348 have the following assigned meanings:

Bit 00 is responsive to an escrow issue switch which indicates that documents have been transported by the escrow transport mechanism to a position where they are available to a terminal user.

Bit 01 is an escrow reject switch signal which indicates that documents within the escrow area have reached an escrow dump bin. Continued energization of the escrow transport mechanism for a predetermined period of time following the appearance and subsequent loss of the escrow reject signal provides assurance that all escrow documents have been dumped into the reject bin.

Bit 02 is responsive to the document feed mechanism selection status condition with a logic 1 indicating that document feed mechanism 2 has been selected by bit position A5.

Bit position 03 assumes a logic 1 when the light path is interrupted to the third photocell, PC3, of the selected document feed mechanism.

Bit position 04 assumes a logic 1 when the light path to a second photocell, PC2, of a selected document feed mechanism is interrupted.

Bit 05 assumes a logic 1 when the light path to a first photocell, PC1, is interrupted for a selected document feed mechanism. It is this cell that originates the signal which causes bit A7 to be reset.

Bit 06 remains at logic 1 so long as there is adequate cash in both of the document feed mechanisms. A cash out condition in either mechanism causes bit 06 to assume a logic 0 condition.

Bit 07 indicates that bit A7 (feed request) is turned on.

Bit 10 is a credit card input switch which indicates that a credit card has been inserted into the terminal 10 by a user.

Bit 11 is a credit card sense switch which indicates that a credit card is adequately returned so that a user may easily remove the card. This switch also allows detection of exit jams and cards pushed back in rather than removed.

Bit 12 is a credit card escrow station switch which indicates that a credit has reached an escrow area adjacent a retention bin. Transportation of a credit card into the terminal 10 for a predetermined time subsequent to the appearance and subsequent disappearance of a logic 1 at bit 12 provides assurance that a credit card has been dumped into a credit card retention bin 650 should card retention be desired.

Bit 13 assumes a logic 1 state while the clutch for the second document feed mechanism is selected.

Bit 14 indicates that the user panel door is in a closed condition.

Bit 15 indicates that the user panel door is in an open condition.

Bit 16 is not assigned.

Bit 17 is the driver wrap error bit and indicates that not all drivers are on as sensed by Schmidt trigger 342.

Bits 20-24 are not assigned.

Bit 25 indicates that either an escrow door through which cash and transaction statements are issued or a deposit door is not locked.

Bit 26 indicates that a deposited document has passed a first sensor, sensor A, along a deposit transport path.

Bit 27 indicates that a deposited document has passed a second deposit sensor, sensor B, along the document transport path.

Because of the large number of status conditions which are sensed by the mechanical control subsystem, an interrupt request is not generated each time a status condition changes. Instead, the microprocessor 72 is expected to maintain the system status information current by reading the status inputs at regular intervals. The set input to interrupt request flip-flop 202 is responsive to a power out warning indicator signal POWI which is generated by a power condition sensor within operator function subsystem 64.

As shown in FIGS. 5 and 6 the document handling system includes a first document feed mechanism 240, a second document feed mechanism 242 which is positioned forward of document feed mechanism 240 and a printer mechanism 250 which is positioned in line with the first document feed mechanism 240. Transaction statements issued by printer 250 and cash issued by document feed mechanisms 240, 242 are transported to an escrow area 228 where they are selectively transported by an escrow document transport mechanism 382.

The printer 250 includes a hopper of cards 386, a forms low sensor 388 generating a signal F.L. and a forms out sensor 390 which becomes active to generate a signal F. OUT when there are no longer sufficient forms to insure the completion of a transaction.

Control circuits 388 receive data information for each print line as well as feed and print/increment signals from the transaction statement subsystem 63. Upon receipt of a feed command, a feed mechanism solenoid 390 within feed mechanism 392 is activated to cause a single transaction statement form to be removed from hopper 386 and transported to a position within a print station 396 where it is ready for the start of printing. A card in position switch 394 senses the position of a form beneath the printing mechanism to stop the feed mechanism 392.

After a form is in place, a print/increment signal causes a column of information to be printed on the form with the form being positionally incremented in preparation for the next print increment command. Information is printed on a form beginning at the left-hand edge with four rows of information being simultaneously printed a column at a time. The print mechanism 250 includes four print wheels 398 which rotates in contact with an inking roller 400, a hammer assembly 402 containing four print hammers which are positioned on the top side of the statement forms opposite the print wheels 398 and a forms increment mechanism which includes a rachet wheel 406, and a pawl 408 which is positioned and connected to advance a form one column position each time a solenoid 410 is activated on command from control circuits 388. A sensor 412 provides indexing information to control circuits 388 to permit the activation of one of the hammers 402 whenever the corresponding print wheel is in proper alignment for the printing of a character as indicated by a data register within the transaction statement dispenser subsystem 63. As soon as the proper character has been printed at each of the four lines, the solenoid 410 is incremented in preparation for the next print/increment command. An interrupt request is generated at the completion of each feed command or print increment command to inform the microprocessor of the execution of the command so that another operation may be commanded.

After 40 print/increment steps, a transaction statement form reaches a form transport mechanism 416 which carries the printed form to stacker wheels 247 and 248 for stacking in a vertical position opposite the first document feed mechanism 240.

After the completion of the printing and stacking of transaction statements cash may be issued by the document feed mechanism 240. It will be appreciated that document feed mechanism 242 is substantially identical to the first document feed mechanism 240 and for this reason only the first document feed mechanism 240 will be described in detail in connection with FIG. 5. The document feed mechanism 240 includes a hopper subassembly 420, a bill feed mechanism 422, a transport mechanism 424 and the stacker wheels 247, 248.

The hopper subassembly includes a hopper 428 for storing the currency 430. Beneath the hopper 428, a feed belt 432 drives a backing plate 434 which forces the bills 430 toward the front of the hopper. As bills are removed from the hopper 428 a pressure sensitive switch 436 is closed to activate a relay 438 to energize a motor 440 and increase the forward pressure on the currency 430 until switch 436 is again opened in response to the increased pressure. The currency 430 is thus continuously urged into communication with the bill feed mechanism 422 under substantially constant force. Forms low sensors FL1 and FL2 for the first and second document feed mechanisms 240, 242 are closed as the backing plate 434 reaches a predetermined switch sensing position. The switches FL1 and FL2 can be connected through remote signal connector 70 to a remote panel to activate an indicator signal in the event that either of the switches FL1 or FL2 becomes closed. In a similar manner, forms out switches FO1 and FO2 are positioned to sense the presence of the backing plate 434 at an even more forward position at which the proper feeding of currency 430 can no longer be assured after completion of the current transaction. The switches FO1 and FO2 are connected to activate bit 06 in the status sensing circuitry 344 in the event that either of the two switches is activated.

The bill feed mechanism 422 includes a separator belt 444 and a restraint belt 446. The separator belt 444 is positioned at the forward most end of the hopper 420 in contact with the forward most bill and driven in a direction to urge the forward most bill downward toward the document transport mechanism 424. While the belt 444 is urging a bill downward, the restraint belt 446 is positioned beneath the hopper 420 on an opposite side of a bill feed path and driven in a direction tending to urge bills back toward the hopper. The coefficient of friction of restraint belt 446 is selected such that the friction between belt 446 and a bill is greater than the friction between two bills. Similarly, the coefficient of friction for belt 444 is selected such that the frictional forces between belt 444 and a bill are greater than the frictional forces between belt 446 and a bill. Thus, as a bill passes between the two oppositely directed belts 444 and 446, the greater frictional force exerted by belt 444 causes the bill to be moved downward toward the document transport mechanism 424. However, should two bills be simultaneously urged downward by belt 444, the frictional force exerted by restraint belt 446 causes all except the bill which is in direct contact with belt 444 to be retained in the hopper 428.

Once a bill is issued by the feed mechanism 422 and reaches the transport mechanism 424 it is moved at a more rapid speed toward the stacker wheel 247, 248. In order to insure proper engagement of a bill within the tines 260 of the relatively slowly rotating stacker wheels 247, 248 the bill feed mechanism 422 must be activated in synchronism with the stacker wheels 245–248 such that the stacker wheels are in the correct position for receiving the bill. For this reason photo sensor 264 responds to light signals passed through the indexing wheel 266 to generate a document feed enable signal DFE at the proper time for initiating a document feed command.

As shown more particularly in FIG. 4, AND gate 252 receives the document feed command from bit position L7 as well as the document feed enable signal (DFE). The output of AND gate 252 is used to set a latch 253 which in turn is connected to the driver which controls the feed clutch. The document feed clutch 236 is thus energized at the proper time to cause a bill to reach the stacker wheels 247, 248 while they are at a proper position to receive and decelerate the bill. A first photocell PC1 is positioned near the document feed mechanism 422 to sense the release of a fed bill. Bit L7, the clutch activation command signal, is immediately reset to terminate the further feeding of bills. Because belts 452 and 454 within the document transport system travel at a much higher rate of speed than the belt 444, a first bill is assured of reaching PC1 photosensor before a second bill can be fed. A second photosensor PC2 is positioned a distance which is slightly greater than the width of a bill downstream from sensor PC1. If two overlapping bills should somehow escape the document feed mechanism 422, both sensors PC1 and PC2 would be activated simultaneously to indicate an error condition at 548. A photocell PC3 is positioned at the terminal end of the document transport mechanism 424 near the stacker wheels 447, 448. Activation of cell PC3 thus indicates the completion of a bill feed step. The failure of a bill to reach photocell PC3 also indicates a jam or other error condition. Sequence checks are executed to insure that a bill passes, PC1, PC2 and PC3 in the correct order. An incorrect order would be an indication that two bills have been fed, or that some other error condition has occurred.

Upon reaching the stacker wheels 247, 248 a bill is engaged by the tines of the stacker wheels and decelerated to permit orderly stacking as the tines rotate counterclockwise. This counterclockwise rotation causes the lower edge of a document to engage a stacking surface 460 so that the document is stacked in a vertical orientation as it is removed from the tines. As the stacker wheels 247, 248 continue to rotate in a counterclockwise direction, the other surface of subsequent tines engaged the document in sliding relationship to maintain it in its vertical position near a transport belt 462 of escrow transport mechanism 382.

The escrow transport mechanism which is best shown in FIG. 6, includes the belt 462 which defines an escrow transport path, the clamping mechanism 234, the reject bin 230 and a belt drive system 480 for belt 462. The escrow transport system 382 has two stacking stations 482, 484 at which documents are stacked in a predetermined vertical orientation adjacent the pairs of stacking wheels 247, 248 and 245, 246, respectively. The two stacks 482, 484 are sequentially formed with a first orderly stack being formed at stacking position 482 by the receipt of bills from document feed mechanism 240 and printed transaction statements from transaction statement printing mechanism 250. Upon completion of first denomination issue a solenoid 486 responds to bit A3 to control the position of the clamping mechanism 234. During the receipt of documents into a stack at either position 482 or second position 484, the clamping mechanism is deenergized by a 0 in A3 and is thus moved to a retracted position so that the pressure rollers 488 are moved away from the drive belt 462 toward the axes of rotation 490 for the stacker wheels 245-248. After the formation of the first stack at position 482 by the orderly deposit of bills and transaction statements in a vertical orientation against the belt 462, the clamping mechanism 234 is moved to a clamping position wherein the first stack is constrained between the pressure rollers 488 and drive belt 462. After the first stack has been clamped the belt drive mechanism 480 is activated to move the belt in a counterclockwise direction to transport the first stack toward the second stacking position 484. Upon arrival of the first stack at the second stacking position the drive belt as sensed by an issue switch SW1 whose output is communicated to bit 00, the belt 462 is stopped with the first stack at the second stacking position 484 opposite stacker wheels 245, 246. Upon arrival of the first stack at the second stacking position 484 the clamping mechanism 234 is moved to a release position and a second stack is formed by the orderly addition of bills from the second document feed mechanism 242.

Upon completion of the second stack, the clamping mechanism 236 is again moved to the clamping position and the belt 462 is moved to carry the second stack toward a document issue slot 28 away from stack position 484 which provides communication between the interior and the exterior of the terminal 10. A closure gate 494 is mechanically coupled to a solenoid 496 which becomes activated to move the closure gate 494 from a closed position 498 to an alternate open position 500 in response to the activation of a document escrow transport mechanism drive motor 502 in a direction which causes a stack to be moved toward the slot 492. As soon as the second stack clears cash issue position 504 as sensed by switch SW 1 closing, the escrow transport mechanism is deactivated and the second stack is retained at the document issue position 504 with the forward portion of the stack extending through slot 28 and the rearward portion of the stack in frictional engagement between the belt 462 and a clamping roller 506 which is the forward most clamping roller 488 mounted on clamping mechanism 234. As soon as the escrow transport drive motor 502 is deactivated, the solenoid 496 is also deactivated causing the closure bar 494 which is lightly biased toward the closure position to bear against the combined second stack of documents in an issue position 504. Upon removal of the combined stack of documents by a user, the closure bar 494 continues to move to the closed and locked position 498 and is sensed by a switch 508 as the locked position 498 is reached. The output of switch 508 is communicated to bit 25 of the mechanical control subsystem status sensing registers for feedback to the microprocessor 72.

As an alternative to the previously described method of dual denomination issue, whereby documents from the first issue mechanism are fed first, the transaction statement is added second and the document from the second issue mechanism is added third, the statement printing could be first started and continued concurrently while documents are issued from the second issue mechanism, transported back to the first stacking position, and supplemented by documents from the first issue mechanism. Finally, the printed statement can then be added when available. The combined stack would then be issued to the user. The closure gate 500 would then be opened when the escrow transport is activated to run in a forward direction toward the document issue slot.

In the event that a sequence error, a bill overlap or other error condition is detected while document are being stacked at one of the stacking positions 482, 484, the terminal is able to recover by transporting all previously stacked documents to a reject bin 230 and reinitiating the entire document issue operation.

The drive mechanism for the belt 462 includes a drive capstan 510 which is coupled to drive motor 502, a turn-around roller 512 positioned at the forward end of the escrow transport path opposite pressure roller 506, a plurality of path defining rollers 514 which are positioned to guide belt 462 between capstan 510 and turn-around roller 512 to constrain the belt 462 as it extends along a generally straight portion of the escrow document path between capstan 510 and roller 512. A pair of guide rollers 516, 518 guide path of belt 462 past the reject bin 230. An idler belt 520 is wrapped part way around capstan 510 to form a circular cornering path for the document escrow transport path which causes rearwardly moving documents to undergo an approximately 180° turn before entering the reject bin 230. Rollers 522, 524 and 526 along with capstan 510 define the path of the idler belt 520 to permit documents to be clamped between idler belt 520 and transport belt 462 as they turn the circular corner. Thus, if an error condition or transaction cancellation condition is detected before the issuance of documents, the motor 502 is activated to drive belt 462 in a reverse direction to cause documents to be moved through the circular corner while clamped between belts 462 and 520 to the reject bin 230. An escrow switch ESCSW2 is positioned to sense documents moving along the escrow transport path adjacent the reject bin 230. The completion of a reject operation is presumed when the transport belt 462 has continued to move in the document reject direction for a predetermined period of time following the movement of documents past switch ESCSW2. The output of ESCSW2 is communicated a bit 01 for detection by the microprocessor 72. The activation and direction of operation for the motor 502 is controlled by a pair of relays 530, 532. The motor 502 is a conventional capacitor phase shift two phase motor connected for bidirectional operation in response to the application of AC power to one of the two winding inputs by relays 532 and 530. Relay 532 is connected to control the direction of drive motor 502 rotation by energization of terminal 536 to cause drive motor 502 to rotate in an escrow direction in response to a one bit at driver bit position A0 and to rotate in an escrow issue direction upon energization of terminal 534 in response to a logic 0 at driver bit A0. Relay 530 responds to a logic 1 at driver bit A2 to turn the escrow motor on and a logic 0 at driver bit A2 to turn the escrow motor off.

Figure 7:
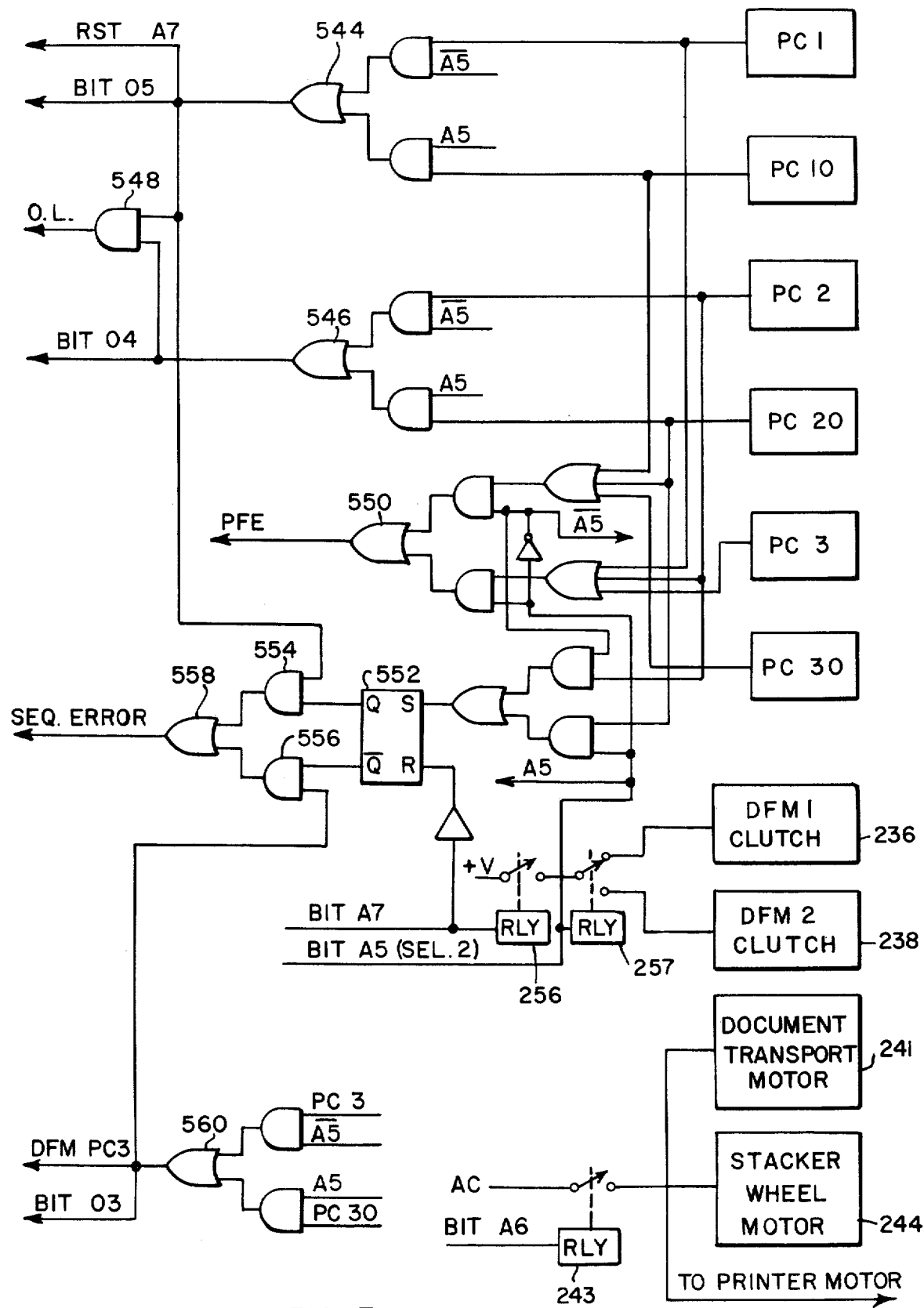
FIG. 7 is a block diagram, schematic represenation of information gathering logic used in the mechanical control subsystem shown in FIG. 4.

Error detection logic and motor control circuitry for the document handling mechanism is shown in FIG. 7. The three photocells along the document transport path for the first document feed mechanism 240 are indicated as PC1, PC2 and PC3 while the corresponding photocells for the second document feed mechanism 242 are indicated as PC10, PC20 and PC30 respectively. Driver bit A5, which selects the second document feed mechanism 242 when at logic 1, and its complement $\overline{A5}$ are utilized to multiplex the sensed document issued mechanism status signals to make the document feed mechanism sensed feedback bits 03, 04, 05, PFE and SEQ. ERROR responsive to the selected document feed mechanism. An OR gate 544 generates a signal which activates bit 05 as well as a reset signal RSTA7 which resets driver bit A7 to deactivate the selected document feed mechanism as soon as the presence of a bill is sensed at the first photocell of the selected document feed mechanism. It is the signal RSTA7 which causes the selected clutch to be deactivated prior to the feeding of a second bill. An OR gate 546 generates a bit 04 signal upon sensing the presence of a bill at the second sensor of the activated document feed mechanism. An AND gate 548 generates an overlength signal, O.L., in response to the simultaneous interruption of light to photocells one and two of a selected document feed mechanism as indicated by the concurrence of signal bit 05 and bit 04. an OR gate 550 is connected to generate a parallel feed error signal, PFE, in the event that light to any of the three photocells in the unselected document feed mechanism are interrupted while the other document feed mechanism is selected by bit A5. Such an interruption would indicate the improper feeding of a bill from the unselected document feed mechanism.

A sequence error detection circuit includes a flip-flop 552, AND gates 554, 556, and an OR gate 558 which responds to the outputs of AND gates 554, 556 to generate a sequence error signal. Flip-flop 552 is connected to be reset whenever the bill feed command bit A7 is off and set whenever a bill passes the second photocell of a selected document feed mechanism. If a bill passes the three photocells in the proper order, AND gate 554 is disabled by the Q output of flip-flop 552 as the bill passes photocell Pc1, PC10 and an AND gate 556 is disabled by the $\overline{Q}$ output of the previously set flip-flop 542 as the bill passes the third photocell PC3, PC30. If a bill passes photocell PC2, PC20 before photocell PC1, PC10 or photocell PC3, PC30 before photocell PC2, PC20 as might happen if a second bill is issued before a previous bill reaches the stacker wheels, a sequence error signal is generated by OR gate 558. An OR gate 560 is connected to indicate the presence of a bill at the third photocell PC3 or PC30 of the selected document feed mechanism and generates an output signal bit 03 and DFMPC3. The document transport motor 455 which drives the document transport belt 452 of the first and second document feed mechanism, the stacker wheel motor 244 which drives the stacker wheels 245–248 for the first and second document feed mechanism 240, 242, and the printer motor 397 which drives the print wheel and transport mechanism for the printer mechanism 250 are also driven in common by a relay 243 which activates the three motors in response to a logic 1 at driver bit A6.

Figure 8:
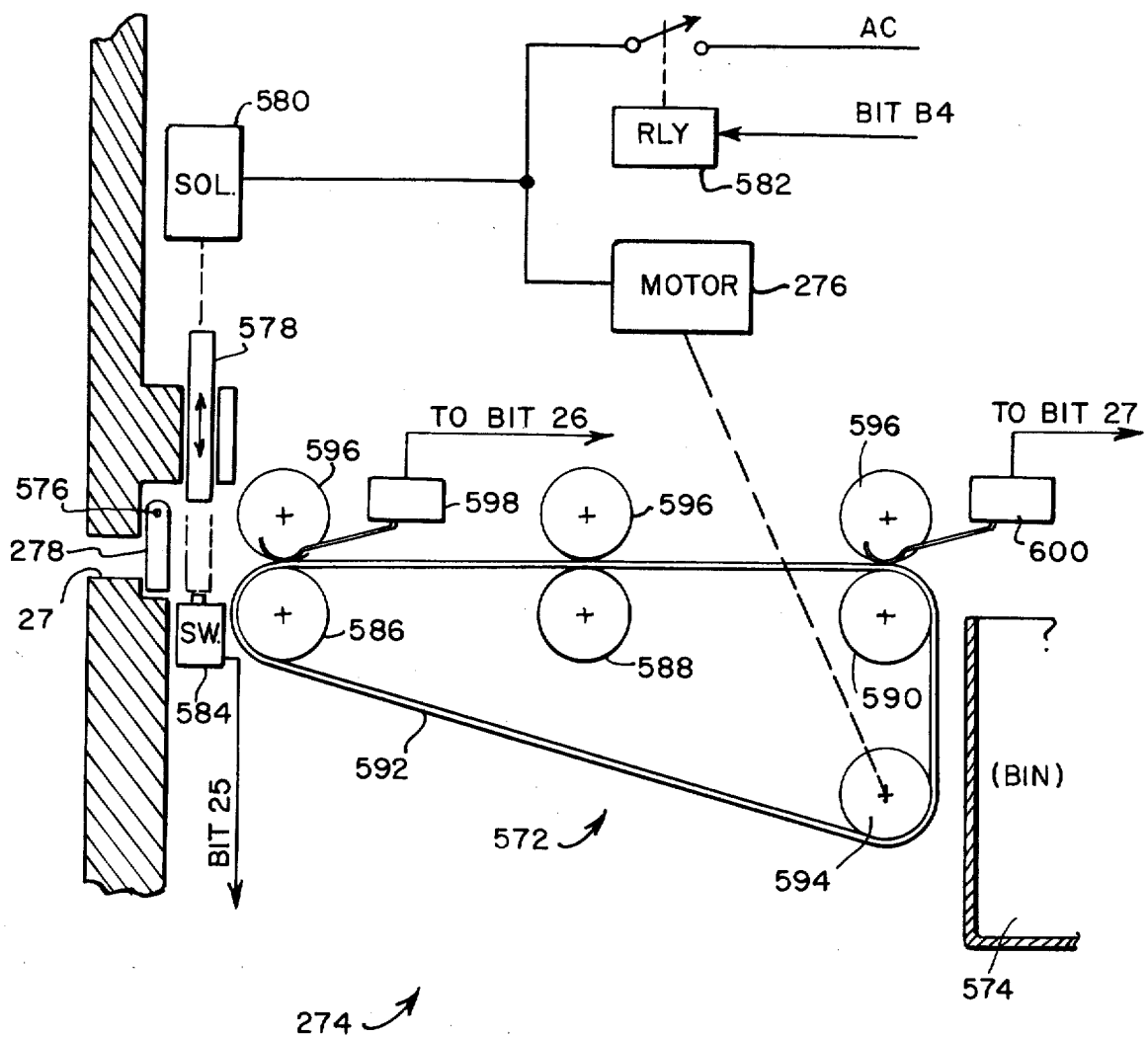
FIG. 8 is a block diagram, schematic representation of a depository mechanism included within the mechanical control subsystem shown in FIG. 4.

As shown in FIG. 8, the deposit mechanism includes a slot 27 through which an envelope containing deposit documents may be inserted, a transport mechanism 572, and a deposit bin 574. A door 278 across the interior wall through which the slot 570 extends is normally locked by a latch 578 but is free to pivot about an axis 576 in response to the insertion of a document through slot 27 when latch 572 is in a raised position. A solenoid 580 is connected to raise the latch 578 to an open position in response to the activation of deposit transport motor 276. The solenoid 580 and the motor 276 are in turn connected for activation by a relay 582 in response to the turning on of driver bit B4. Thus, as bit B4 is set to logic 1, the latch 578 is raised to release the door 278 and the transport mechanism 572 is turned on to receive and frictionally engage any document which is inserted through slot 27. A switch 584 is positioned to sense the presence of latch 578 in the locked position with the output thereof being communicated to bit 25 of the data register.

The depository transport mechanism 572 includes three idler rollers 586, 588 and 590 positioned along the depository document path, a belt 592 defining the depository document path, and a capstan 594 connected to the drive belt 592 along the depository path in response to the activation of motor 276. Pressure rollers 596 are positioned opposite the belt rollers 586, 588 and 590 on the opposite side of the deposit document path from belt 592 to constrain deposited documents to the depository document path. An insertion switch 598 is positioned at the forward end of the depository document path in the vicinity or roller 586 to sense the insertion of a document through a slot 27 and past the door 278. The output of switch 598 is conveyed to data input position bit 26. A second sensor switch 600 is positioned at the terminal end of the depository document path adjacent the depository bin 574. The output of switch 600 is connected to data input position bit 27 to permit detection by microprocessor 72 of the presence of deposited documents at the end of the depository document path. Microprocessor 72 can be assured that documents have entered the depository bin 574 by maintaining the depository transport mechanism 572 in an active status for a predetermined period of time after the passage of documents beyond sensor 600 has been detected. Depository 274 thus provides a secure means for receiving deposited documents having a first protection door 278 which is automatically latched by the deactivation of solenoid 580 in the event of a power failure. The depository mechanism 572 may be completely controlled by the receipt of simple control commands from the microprocessor 72 by the driver register of the mechanical control subsystem 61.

The credit card handling mechanism 226 is shown in FIG. 9 and includes a card insertion slot 20, an open/close sign 612 illustrated in the closed position, the blocking roller 272 and a transport mechanism 614. When the terminal 10 is open to receive transaction requests from a user, a logic 1 is set in driver position bit B3 to activate solenoid 263 and cause the rotation of sign 266 in a clockwise direction about axis 616. As the sign 266 rotates about the axis, a "closed" sign is rotated upward beyond the view of a window 618 and an "open" word is rotated into the field of view for window 618. Simultaneously, a drive link 620 couples the sign 266 to latch 268 to rotate latch 268 about an axis 622 to an open position in which the blocking roller 272 is permitted to rise upon insertion of a credit card 270 through the entry slot 20. The credit card transport mechanism includes a belt 624 which is maintained in tension about credit card path defining rollers 626, 628 and 630, idler rollers 632, 634 and a drive capstan 636. The belt 624 is diverted to engage capstan 636 as it passes between rollers 628 and 630. The credit card path is defined by rollers 626, 628 and 630 which are driven by belt 624. Belt 624 passes adjacent the credit card path between rollers 626 and 628 but does not define credit card path. Drive capstan 636 is coupled to a credit card transport drive motor 638. Positioned adjacent the path defining roller 626, 628 and 630 are three pressure rollers 640 disposed on the opposite side of the credit card transport path thereof for the purpose of constraining an inserted credit card to the credit card transport path. A switch 642 having the output thereof connected to data sense position bit 10 is disposed at the forward end of the credit card transport path to sense the insertion of a credit card 270 through the slot 20 or the removal of a credit card 270 from the slot 20 at the completion of a requested transaction. A read head 644 is positioned along the credit card transport path to read information stored on a magnetic stripe of a credit card 270 as the card is transported beneath the read head 644. The output of read head 644 is communicated to read data logic within the processor support subsystem 60 for processing prior to communication to the data processor 72 through processor support subsystem 60. A switch SW2 646 is disposed along the credit card path approximately midway between rollers 626 and 628 to sense the passage of a credit card through the slot 610 and out of the control of a user.

A sensor 648 is positioned at the rearward end of the credit card transport path to detect the arrival of a card 270 at a card escrow position after it has passed beneath read head 644 and to detect the passage of a retained credit card to the end of the credit card transport path prior to the deposit of a retained card into a retention bin 650. Insurance of the depositing of a retained card into bin 650 can be realized by maintaining the credit card transport mechanism active in a credit card retention direction for a predetermined period of time following the passage of a credit card beyond switch 648. The output of switch 648 is communicated to data assembly position bit 12.

Credit card transport drive motor 638 is a capacitor phase shift two phase AC motor which may be selectively driven in either of the two directions of rotation by selectively activating one of two input terminals thereto under control of a relay 532. Relay 532 is responsive to driver position bit A0 and causes the motor 638 to move a credit card into the terminal when set to logic 1 and move a credit card toward the slot 610 when set to logic 0. A relay 656 is connected in series between relay 532 and an AC power source to activate the motor and the selected direction in response to a logic 1 at driver position bit A1. The open sign 266 and credit card transport mechanism 614 are thus controllable by the microprocessor by the selective loading of data into the driver registers 216, 218 and 220 of the mechanical control subsystem 61. All branching or decision making functions for the credit card handling system 226 are thus retained by the microprocessor 72 while the actual execution of commanded functions is performed by the control mechanism subsystem 61 in direct response to specific microprocessor commands.

Referring now to FIG. 10, the control mechanism for the user panel door 16 is shown as including a lever arm 660 which extends from a pivot axis 662 at one end thereof to the door 16 where the opposite end is connected to door 16 by a slot 664 which receives a pin 666. The door 16 and lever arm 660 are shown in primary closed position. The door 16 is mechanically coupled to a damping mechanism which is schematically represented by damper 668 and is also connected to a spring 670 which urges the door 16 downward to a closed position.

A latching mechanism 674 includes a drive link 676, a closed latch 678 and an open latch 680. The drive link 676 includes a lower slot 682 and an upper slot 684. The lower slot 682 is engaged by a pin 686 on a horizontally extending lever arm 688 of latch 678. Latch 678 is mounted to pivot about an axis 690 which extends generally parallel to the lift bar 660. A latching arm 692 of latch 678 extends generally downward and toward the lever arm 660 at an oblique angle with respect to horizontally extending lever arm 688. The open latch 680 includes a lever arm 696 which extends generally horizontally from a pivot axis 698 extending generally parallel to lever arm 660 and a latching arm 702 which extends generally upward toward the path of motion of door lever arm 660 from axis 698 at an oblique angle with respect to lever arm 696. A pin 700, which is mounted on lever arm 696, engages the upper slot 684 of drive link 676.

The drive link 676 is coupled to a solenoid 704 which moves the drive link 676 vertically upward when energized. A spring 706 pulls the drive link 676 vertically downward when the solenoid 704 is not energized. A spring 708 is connected to bias the lever arm 688 of latch 678 downward while a spring 710 is connected to bias lever arm 696 of latch 680 vertically upward.

The door 16 and lever arm 660 are movable between two extreme positions as the lever arm rotates about the axis 662. The door 16 and arm 660 are shown in a down or closed and locked position with an alternate open or up and latched position being indicated for lever arm 660 by dotted outline 712.

In the down and locked position in which the door 16 and lever arm 660 are shown, any attempt to raise the door 16 will exert a torque on latch 678 tending to rotate the latch 678 in a clockwise direction about the axis 690. However, the pin 686 engages the bottom of lower slot 682 to oppose this rotational torque. At the same time, the pin 700 on lever arm 69 engages the upper end of upper slot 684 causing drive link 680 to rotate clockwise about axis 698 to remove latching arm 702 from the path of motion of lever arm 660. Thus, while the drive link 676 is in the lower or locked position as shown, the latching of the lever arm 660 in the upper position 712 is disabled and the latching of lever arm 660 in the closed position is enabled.

Upon energization of solenoid 704, the drive link 676 is moved vertically upward to an open, unlocked position. In this position the lower end of lower slot 678 engages pin 686 to rotate latch 678 counterclockwise about axis 690 to remove latching arm 692 from the path of motion of the lever arm 660, permitting the door 16 to be raised without interference. At the same time, the open latch 680 is also permitted to rotate counterclockwise about axis 698 with the latching arm 702 being rotated into the path of the lever arm 660 with the pin 700 engaging the top of slot 684 to prevent further counterclockwise rotation of lever arm 680 about axis 698. As the door 16 and lever arm 660 are raised toward alternate position 712, the top 718 of lever arm 660 engages an angular planar surface 720 of latching arm 702 causing latch 680 to be rotated clockwise with a pin 700 moving downward in the upper slot 684. As the lever arm 660 moves past the latching arm 702 to the open position 712, latching arm 702 is permitted to snap back into the path of the lever arm 660 under the bias of spring 710 to prevent the lowering of lever arm 660 and maintain arm 660 in the open position 712.

Upon termination of power to solenoid 704, whether on command or as the result of a power failure, spring 706 returns drive link 676 to the vertically lowered or lock position in which it is primarily shown in FIG. 10.

As drive link 676 moves vertically downward the pin 700 engages the top of slot 684 causing latch 680 to rotate in a clockwise direction to remove the latching arm 702 from the path of motion for the door lever arm 660. Door 16 is thus permitted to fall to a closed position in a controlled manner under the influence of spring 670 and damper 668. As the lower edge 722 of door lever arm 660 approaches the closed position which is shown, lower surface 722 engages an angular planar surface 724 on latching arm 692 causing the arm to be rotated counterclockwise out of the path of door lever arm 660 as the pin 686 rises within slot 682. After the upper surface 718 of door lever arm 660 clears the latching arm 692, latch 678 rotates under the influence of spring 708 to bring latching arm 692 back into the path of lever arm 660 and lock the door 16 in the closed position. Latching mechanism 674 is thus a fail safe device which permits the door 16 and door lever arm 660 to be latched in an open position 712 so long as solenoid 704 is energized but which automatically locks the door in a closed position in the event of a power failure.

A control circuit permits a logic 1 at driver relay register bit B0 to command a door open position and a logic 0 at position B0 to command a door closed position. A door control motor 728 has coupled thereto a first cam 730 having a rotating bearing 732 eccentrically positioned thereon. Also coupled to motor 728 is a cam 734 having a concavity 736 therein which extends over a small portion of the circumference of cam 734. A cam follower 738 rides the cam to control the position of a switch 740 which is shown in a down position 742. A relay 744 responds to driver bit B0 to control the position of a switch 746 which is illustrated in a down position 748.

The relay 744 responds to a logic 1 at driver bit B0 by changing switch 746 to an alternate door open position 750. With the switch in position 750 the solenoid 704 is activated to move the latching mechanism 674 to a door open position. Simultaneously, the motor 728 is energized to rotate arm 730 in a clockwise direction. As arm 730 rotates, the bearing 732 engages the lower edge 722 of door lever arm 660 to raise the door lever arm 660 and door 16 to the alternate open position 712 where the door lever arm 660 is held open by latch 680 as previously explained. The cam 730 and bearing 732 then continue to rotate through a nearly complete revolution to alternate position 754. Cam 734 rotates in a counterclockwise direction concurrently with cam 730 with the cam follower 738 engaging the outer circumference of cam 734. As the cams 730, 734 approach one complete revolution, the follower 738 engages a leading edge 756 of the cavity 736 on cam 734. As the cam follower 738 moves radially inward following edge 756, the snap action switch 740 is switched to an alternate position 758 to terminate power to the motor 728. As this switching action occurs, the cam follower 738 is in engagement with leading edge 756 of concavity 736 and cam 730 is in alternate position 754. The door mechanism remains in this condition so long as a logic 1 at bit B0 commands an open condition for door 16.

Upon termination of the open command, relay 744 returns switch 746 to position 748 to deenergize solenoid 704 and cause the door lever arm 660 and door 16 to fall to a closed and latched position as previously explained. At the same time, switch position 748 causes motor 728 to be energized through switch position 758 of switch 740. This energization causes the motor 728 to begin rotating in a clockwise direction. As cam follower 738 engages the trailing edge 762 of concavity 736 it begins to move radially outward to return switch 740 to the position 742 in which it is shown. At this time the cam 730 has rotated to the position at which it is shown, and further energization of motor 728 is discontinued. The door mechanism is now in position to be reopened in response to a logic 1 signal at driver register bit B0.

USER COMMUNICATION SUBSYSTEM

Figure 11:
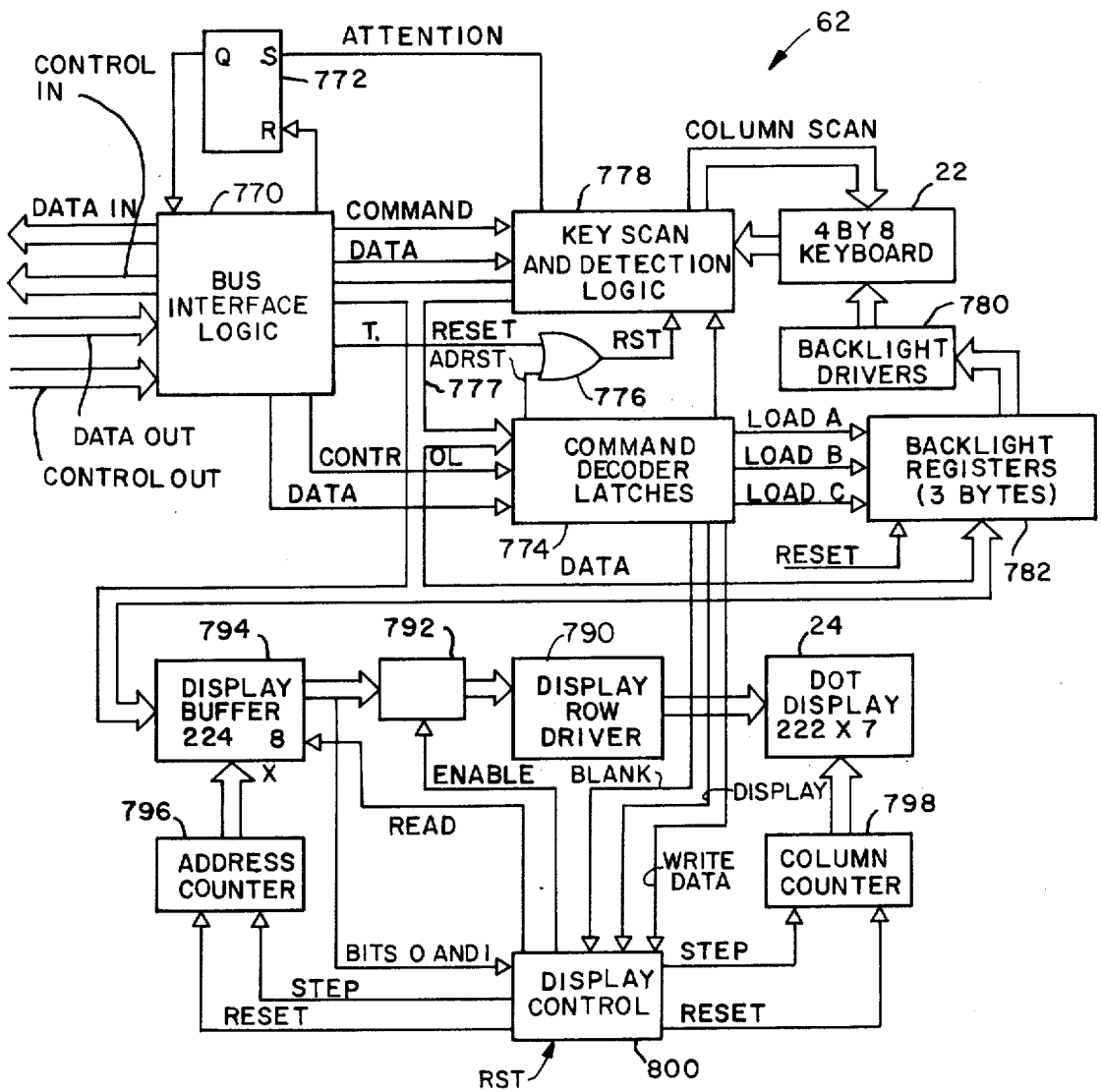
FIG. 11 is a block diagram representation of a user communication subsystem for the control system shown in FIG. 2.

Referring now to FIG. 11, there is shown the user communication subsystem 62 which operates to control the keyboard 22 and optical guidance display 24. The portions of subsystem 62 which are common to each of the subsystems 60–64 include bus interface logic 770, interrupt request flip-flop 772, command decoder and latches 774, and reset OR gate 776 which ORs the terminal reset signal, T. Reset, with the commanded subsystem reset signal ADRST to generate reset signal RST. These common elements operate as described in conjunction with processor support subsystem 60 and mechanical control subsystem 61 except that the command signals which are decoded and latched may be peculiar to the user communication subsystem 62. These common elements of subsystem 62 will therefore not be further described.

Key scan and detection logic 778 operates by incrementally scanning column input lines to keyboard 22, while sensing row output signals. Whenever an activated key is scanned by the column scan mechanism the scan signal is communicated through the key to a row signal which is detected by the key scan detection logic 778. Upon detection of a row signal by the key scan and detection logic 778, an attention signal is generated which sets the interrupt request flip-flop 772. The microprocessor 72 processes the interrupt request by generating a read reyboard command which is latched and gated at the data time to cause key scan and detection logic to gate onto the data bus 777 a signal indicating the column which was being scanned when the row signal was detected and the keyboard row on which the signal was detected. The microprocessor 72 is thus able to determine the exact key which was activated and respond accordingly.

The code assignments for indicating the activation of keyboard keys are given as follows by hexidecimal code, row position, column position and designation:

| | | | |
|---|---|---|---|
| 00 | R1 | C8 | Cancel |
| 03 | R4 | C8 | Proceed |
| 04 | R1 | C7 | Key 3 |
| 05 | R2 | C7 | Key 6 |
| 06 | R3 | C7 | Key 9 |
| 07 | R4 | C7 | Decimal Point. As an option, this key may alternatively represent triple zero, 000 |
| 08 | R1 | C6 | Key 2 |
| 09 | R2 | C6 | Key 5 |
| 0A | R3 | C6 | Key 8 |
| 0B | R4 | C6 | Key 0 |
| 0C | R1 | C5 | Key 1 |
| 0D | R2 | C5 | Key 4 |
| 0E | R3 | C5 | Key 7 |
| 0F | R4 | C5 | Correction |
| 10 | R1 | C4 | TO CHECKING |
| 11 | R2 | C4 | TO SAVINGS |
| 12 | R3 | C9 | TO CREDIT CARD |
| 13 | R4 | C4 | TO SPECIAL ACCOUNT (optional selection) |
| 14 | R1 | C3 | FROM CHECKING |
| 15 | R2 | C3 | FROM SAVINGS |
| 16 | R3 | C3 | FROM CREDIT CARD |
| 17 | R4 | C3 | FROM SPECIAL ACCOUNT (optional selection) |
| 18 | R1 | C2 | DEPOSIT |
| 19 | R2 | C2 | PAYMENT BY DEPOSIT |
| 1A | R3 | C2 | PAYMENT BY TRANSFER |
| 1C | R1 | C1 | WITHDRAW (cash issue) |
| 1D | R2 | C1 | OTHER (optional selection) |
| 1E | R3 | C1 | ACCOUNT INQUIRY |
| 1F | R4 | C1 | TRANSFER |

The backlights of the keyboard 22 are connected to individual backlight drivers 780 in a one to one relationship. The backlight drivers 780 are in turn connected to backlight registers 782 in a one to one relationship. The backlight registers 782 include three 8 bit registers designated A, B and C. Three command control signals, load A, load B and load C, permit the selection of one of the three registers for loading in accordance with information appearing on data bus 777 as the load command is generated at data time. The reset command clears all three registers to turn off the backlights.

The data bit assignments for register 782 are sumarized as follows:

| | |
|---|---|
| A0 | Withdraw light |
| A1 | Other light (optional selection function) |
| A2 | Account inquiry light |
| A3 | Transfer light |
| A4 | Deposit light |
| A5 | Payment by deposit light |
| A6 | Payment by transfer light |
| A7 | Not implemented |
| B0 | From checking light |
| B1 | From savings light |
| B2 | From credit card light |
| B3 | From special account light (optional selection) |
| B4 | To checking light |
| B5 | To savings light |
| B6 | To credit card light |
| B7 | To special account light (optional selection) |
| C1 | Test. This bit causes key scan and detect logic 778 to respond as though the transfer key had been activated. |
| C2-C6 | Not implemented |
| C | Audio tone which is generated by a conventional tone generator (not specifically shown) as a user feedback signal upon activation of a keyboard 22 key. |

The control circuitry for the 222 by 7 dot display 24 includes a display driver 790, a gate 792, display buffer 794, and the address counter 796, a column counter 798 and display control logic 800. Dot display 24, while it is in operation, is continually refreshed as columns of information are sequentially read from display buffer 794 and gated through gate 792 to activate display driver 790 to selectively turn on display dots at columns indicated by column counter 798. As the display is refreshed, address counter 796 and column counter 798 are synchronously incremented by simultaneous step commands so that address counter 796 addresses a storage location in display buffer 794 which corresponds to the current column counter address signal 798. A reset signal is generated by display control logic 800 at the end of each refresh "scan" to reset the address counter 796 and column counter 798 and thus allow a new refresh cycle to start. These reset signals are also generated in response to the subsystem reset signal RST which also causes a blanking of the display. Control commands for the display control system include a write data command which causes data appearing on the data bus line 777 to be written into the display buffer 794 starting with address 0 on the first write command following a blank command and causes address counter 796 to be incremented by a step command upon termination of the write data command. A display command causes the display of the information stored in display buffer 794. Similarly, the blank command causes the termination of the display of information stored in display buffer 794. Display buffer 794 contains 224 addressable 8 bit storage locations with the first address location and the address location following the last address location containing display information being control address locations. In all column locations for the dot display are being utilized, this last display location would occur at address 224. In general, however, this last display location may occur at any address position, depending upon the length of the message being displayed. Bit position 0 is utilized for control information and bit positions 1 through 7 are operative to indicate a dot of display in the associated column on the display 24. The bit 0 position of an address location must contain a 1 for the first and last address locations and a 0 for all display information address locations. The presence of a logic 1 at the first and last address identifies these words as control and allows bit position 1 to serve as a modifier. A 0 at bit position 1 indicates a first word and first address position and a 1 at bit position 1 indicates the last address position. The bit 0 and bit 1 control signals are utilized to simplify the display control logic 800 and to eliminate the need to scan the dot display 24 column locations for which no information is to be displayed.

When data is to be loaded into the display buffer 794 a blank command is first required to return the address counter 796 and column counter 798 to address location 0. Column counter 798 generates no visible display at address 0. Display information may then be loaded into the display buffer 794 by successive write data commands which cause the writing of data from bus 777 into the addressed location followed by the incrementing of address counter 796. The information content of bits 1–7 of the display address locations may contain any selected information content chosen to generate a desired display pattern.

The use of a "dot image" rather than character format for the refresh buffer 794 allows the microprogram in data processor 54 to provide character font flexibility whereby the terminal proprietor can specify in his initialization message the text of the various display messages and further can define unique graphics for display in the messages. As an example which may save either memory storage space or message transmission time, a word used commonly in many messages could be identified as a unique graphic and displayed as the representation of a single character in a message. A second example of a special graphic may be a foreign letter. This dot technique also permits the use of variable width letters for greater readability and greater display capacity for a given display size.

TRANSACTION STAGEMENT DISPENSER SUBSYSTEM

Figure 12:
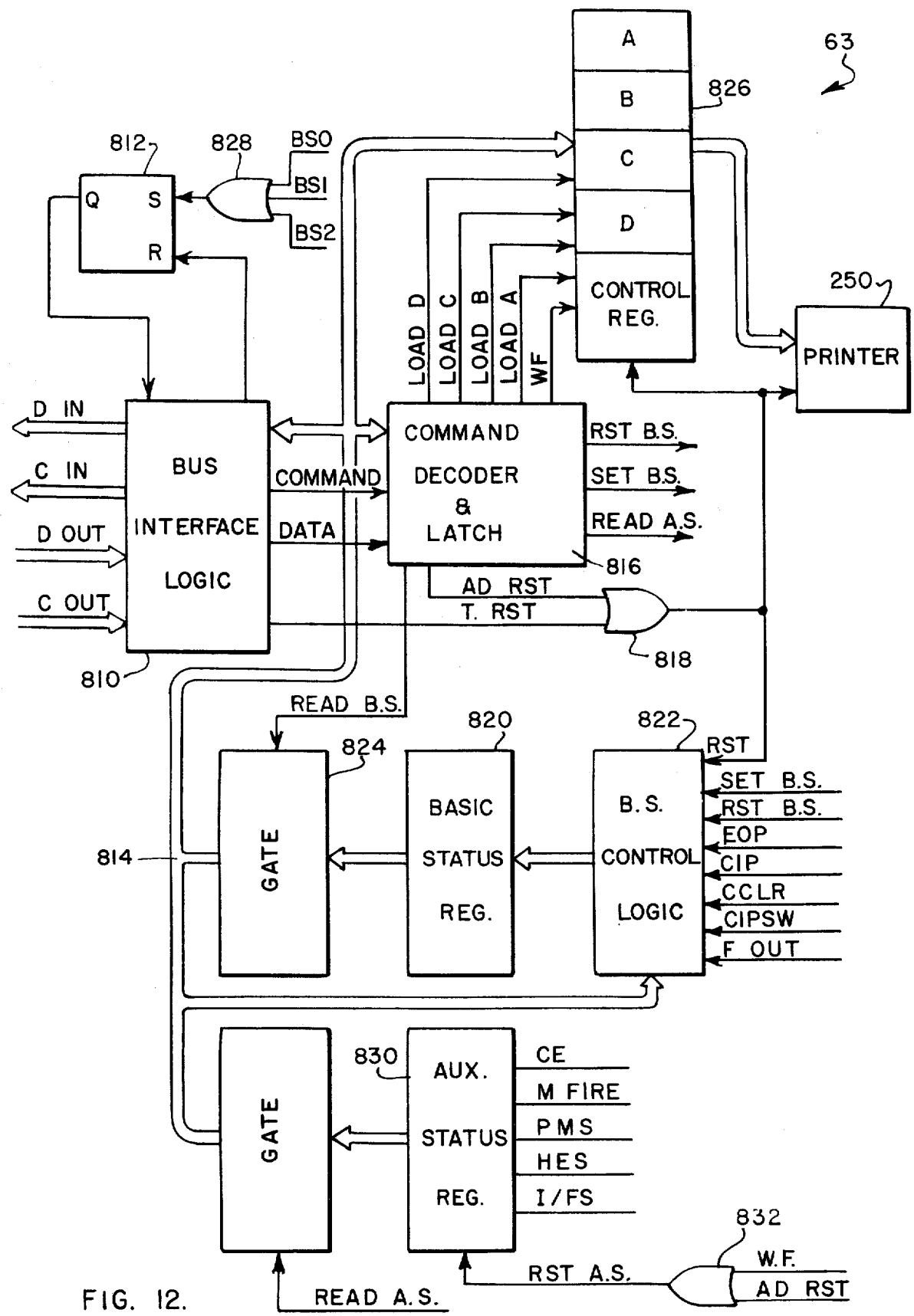
FIG. 12 is a block diagram representation of a transaction statement dispenser subsystem included within the control system shown in FIG. 2.

As shown in FIG. 12, the reaction statement dispenser subsystem 63 controls and receives feedback and status information for the printer 250. The elements of transaction statement dispenser subsystem 63 which are common to the subsystems 60–64 include bus interface logic 810, interrupt request flip-flop 812, a data bus 814, a command decoder and latch 816 and OR gate 818 which generates the subsystem reset signal RST in response to either the terminal reset signal or a control command reset signal ADRST, a basic status register 820, basic status control logic 822, and basic status gate 824. The printer 250 is controlled by loading information into a register 826 which includes five 8 bit bytes designated A, B, C, D and control register. Information appearing on the data bus 814 is selectively loaded into these registers at data time in responsee to the commands load A, load B, load C, load D, and WF (WRITE FUNCTION), respectively. Information written into registers A, B, C and D of register 826 determine the character which is printed at a given column position of a transaction statement for rows 1, 2, 3 and 4 respectively. The control register stores commands for controlling the operation of printer 250. Bit 0 of the control register is a document feed bit and the writing of a logic 1 into this bit position causes transaction statement form to be fed from a hopper and transported to a print station in preparation for the printing of a left-most column of characters. Bit position 1 is a print/increment command bit with a logic 1 in this bit position commanding the printing of information indicated by registers A, B C and D at the present column location of the transaction statement form followed by the incrementing of the column location of the transaction statement form. Bits 2–7 of control register are not implemented. The set input to interrupt request flip-flop 812 is controlled by an OR gate 828 which responds to basic status bits BS0, BS1 and BS2 to generate an interrupt request any time one of these bit positions assumes a logic 1 condition. Within the basic status register 820, bit 0 represents an end of print bit. This bit position is turned on by and end print signal (EOP) after all four row positions of a column have been printed and while the transaction stagement form is being incremented. Bit position 1 of the basic status register is a card in place (CIP) bit position and when set to logic 1 indicates that a preceding transaction statement form feed operation has been completed and the form is at the print station ready for the printing of the first column. The CIP signal is generated only at the leading edge of a CIP switch sensor as a transaction statement form enters the print station. After this bit position is reset, it is not again set until a new transaction statement form enters the print station. Bit position 2 of the basic status register is a card clear bit position (CCLR). A logic 1 in this bit position indicates that a transaction statement form has ejected from the print station at the completion of the printing information thereof and has reached the end of the form transport mechanism where it is about to enter the rotating stacker wheels of the document feed mechanism. Bit position 3 of basic status register 820 is a card in place switch (CIPSW) bit position. This bit position remains set to logic 1 so long as a transaction statement form is in the print station. It is turned on as the card enters the station and turned off as a card leaves the station at increment 41. Bit position 4 is the forms out (F. OUT) bit and is set to logic 1 when the forms out sensor switch indicates that there are insufficient transaction stagement forms left in the hopper to complete a new transaction request. Bit positions 5, 6 and 7 of basic status register 820 are not implemented.

The bit positions of basic status register 820 are controlled in accordance with the following functions:

SET B.S.0 = SET BS·AD1+EOP
RST B.S.0 = RST B.S. ·AD1+RST
SET B.S.1 = SET B.S.·AD1+CIP
RST B.S.1 = RST B.S.·AD1+RST
SET B.S.2 = SET B.S.·AD2+CCLR

RST B.S.2 = RST B.S.·AD2+RST
SET B.S.3 = SET B.S.·AD3+CIPSW
RST B.S.3 = RST B.S.·AD3+RST
SET B.S.4 = SET B.S.·AD4+F.Out
RST B.S.4 = RST B.S.·AD4+RST

An auxiliary status register 830 provides printer feedback information which supplements the information provided by the basic status register 820. The latches of the auxiliary status register 830 are set by the occurrence of a logic 1 on the corresponding input signals therefor and reset by a reset auxiliary status signal, RST A.S., which is generated by an OR gate 832 in response to a WF command or an AD RST command. Bit position 0 of the auxiliary status register 830 is a count error bit CE. As the print wheels are rotated, an indexing signal is generated by sensor 412 each time the print wheels rotate past a home position. A counter is also incremented beginning with the home position for each rotation of the print wheels through a character position. If this counter does not store count 63 when the home index signal is generated, the CE signal is generated to turn on bit 0 of auxiliary status register 830. Bit 1 of the auxiliary status register 830 is a misfire bit (MFIRE). This signal is generated by sensing each print magnet while its driver is turned on. If any of the four print magnets is not energized while the driver is turned on, a signal MFIRE is generated to turn on bit 1 of the auxiliary status register 830. Bit 2 is a print magnet sense bit (PMS). Signal PMS indicates that either at least one of the print magnets is energized or by sensing a low voltage level at the driver input thereto. Bit position 3 of the auxiliary status register 830 is the home emitter sense (HES) signal and is set in response to the generation of the index home signal by sensor 412. Bit 4 is the increment feed sense bit (I/FS) and is set to logic 1 whenever the incrementing solenoid 410 is energized. Auxiliary status register 830 is red by the microprocessor 72 by generating a READ A.S. control command which is made available to a gate 863 to gate the contents of auxiliary status register 830 onto subsystem data bus 814 at data time.

OPERATION FUNCTION SUBSYSTEM

Figure 13:
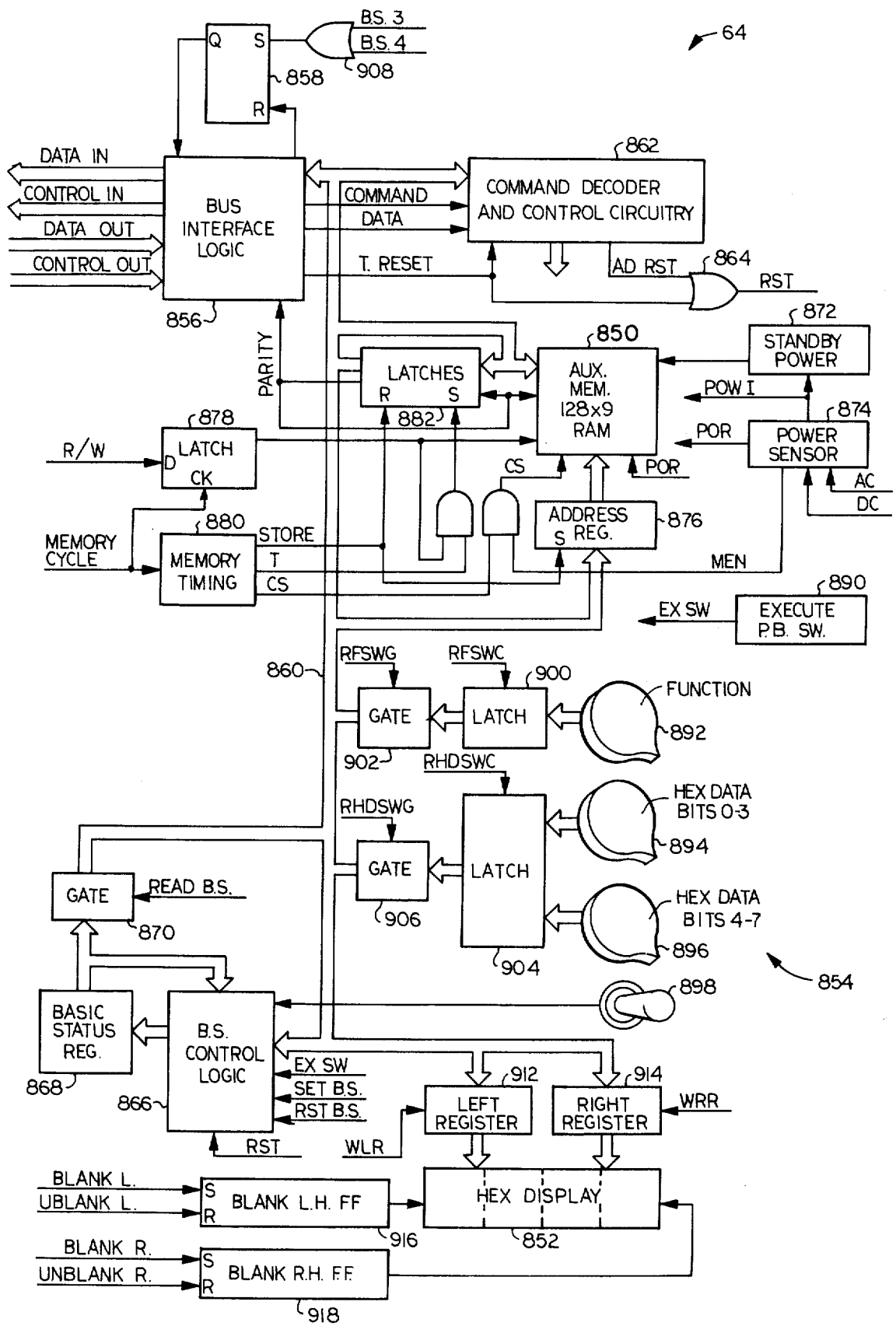
FIG. 13 is a block diagram representation of an operator function subsystem included within the control system shown in FIG. 2.

As shown in FIG. 13, the operator function subsystem controls the operation of the auxiliary memory 850 as well as a four digit hexidecimal display 852 and data entry switches 854 on an operator panel which is accessible through an operator panel door at the rear of the terminal 10. The elements which are common to each of the subsystems 60–64 include bus interface logic 856 and interrupt request flip-flop 858, a data bus 860, command decoder and control circuitry 862, and an OR gate 864 which generates a subsystem reset signal RST in response to a terminal reset signal or a command control reset signal ADRST, basic status control logic 866, an 8 bit basic status register 868, and a gate 870 between the output of the basic status latches 868 and the data bus 860. The operation of these common elements have been described in conjunction with the processor support subsystem 60 and mechanical control subsystem 61 and will not be repeated at this time.

The control circuitry for the auxiliary memory 850 includes a standby power source 872 and a power sensor 874 which senses AC and DC power level within the terminal 10 and generates a power out warning interrupt signal (POWI) which activates the standby power to memory 850 in the event that a short duration AC utility power failure is detected as a warning that logic power will soon be unavailable.

Signal POWI causes standby power circuits 872 to switch auxiliary memory 850 from utility power to emergency memory protect power (e.g., a battery) and also generates an interrupt request through flip-flop 202 of the mechanical control subsystem 61. The microprocessor 72 responds to this interrupt by storing auxiliary memory 850 any critical information such as cash counts or transaction counts which are required for resumption of operation after power is restored. A short time later, after the microprecessor has had time to store pertinent parameters, access to memory 850 is disabled by terminating a memory enable signal, MEN, which normally enables an AND gate 875 which controls chip selection for memory 850 operation. Shortly after signal MEN is terminated, the power sensor 874 generates a power on reset signal, POR, to command a terminal reset through control gate 102 of processor support subsystem 60. POR is an active low signal that remains so long as there is any meaningful power to terminal 10. The resulting T. Reset signal constrains the microprocessor to address the predeterined program startup memory location.

Upon reactivation of utility power, the POWI signal is terminated after all power signals are adequately available. The MEN signal is then generated followed by termination of signal POR to permit the microprocessor to begin executing instructions starting with the reset memory address location. The automatic resumption of terminal operation following a power failure is thus implemented.

Two data bus cycles are required to write information into or read information from auxiliary memory 850. The first is a write cycle which causes a desired address location to be written into an address register 876. The second is a read or write command which causes information on data bus 860 to be received from or written into the memory 850. Upon generation of the subsequent read or write command, a memory cycle signal is generated by command decoder and control logic 862 which, during the command time, causes a read or write indication to be set into a latch 878 and initiates a memory timing cycle for memory timing circuitry 880. Circuitry 880 generates appropriate timing signals for initiating chip select and strobing information into the input data latches in the event of a write cycle.

The operator switches 854 include a momentary pushbutton execute switch 890, a 16 position rotary function switch 892, a most significant 16 position hexidecimal rotary data switch 894, a 16 position least significant hexidecimal data switch 896, and a toggle switch 898. A decoder and latch 900 decodes and latches the output of switch 892 at command time in the event that a command is received to read the function switch 892. The latch is set by a command read function switch signal, RFSWC, to prevent the data information from changing during the subsequent data time in the event that the function switch 892 is turned. At the immediately subsequent data time, a read function switch gate signal, RFSWG, is generated to activate a gate 902 to gate the contents of latch 900 onto the data bus 860. The decoder output of switch 892 is carried at lines AD0–AD3 of the data bus 860. Similarly, a read data switch command causes the generation of a read data switch command signal, RHDSWC, which causes a decoder and latch 904 to latch the output of switches 894 and 896. During the subsequent data time a read data switch gate signal (RHDSWG) activates gate 906 to drive the data bus 860 with the decoder outputs from switches 894 and 896 with the outputs from switch 894 being presented on lines ADO–AD3 and the outputs of switch 896 being presented on lines AD4–AD7. The outputs of toggle switch 898 and execute switch 890 are connected to drive bit positions 3 and 4, respectively, of the basic status register 868 which in turn drive an OR gate 908 to set the interrupt request flip-flop 858. The activation of the pushbutton switch 890 serves as an operator command to have the microprocessor 72 sample and respond to the status of the rotary swtiches 892, 894 and 896 at the time of activation of the pushbutton 890. The toggle switch 898 is used to indicate a selected document feed mechanism 240 or 242 with a logic 1 output indicating the selection of the second document feed mechanism 242.

There are 16 possible functions which are available for selection by function selection switch 892. One position permits the loading of an encryption key A through the data switches 894, 896 two digits at a time, eight activations of switch 890 being required to load all 16 digits (8 bytes). Another position permits the loading in a similar manner of a backup transmission encryption key, key C. Two other positions command the resetting of key A and key C which are supposed to be reset prior to the selection of any other operator function. However, the microprocessor resets these keys upon selection and command of an operator function even if the operator does not. The maintenance operator is thus prevented from gaining access to these keys. Other positions permit the selective display or resetting of a consecutive decimal count which indicates a number of issued bills. The applicable document feed mechanism 240 or 242 is determined by the position of toggle switch 898. A self test position commands the printing and issuance of a transaction statement having a predetermined test message and the issuance of a single bill from a document feed mechanism 240 or 242 indicated by toggle switch 898.

Only two bits of basic status register 866 are implemented. Bit 1 responds to the execute switch 890 and bit 3 responds to the toggle switch 898. The control signals are:

SET B.S.1 = SET B.S.·AD1+TOGGLE SWITCH
RST B.S.1 = RST B.S.·AD1+RST
SET B.S. 4 = SET B.S.·AD4+EXSW
RST B.S.4 = RST B.S.·AD4+RST

The four digit hexidecimal display 852 is driven in response to two registers. A left register 912 drives the two left-most digits while a right register 914 drives the two right-most digits. Command decoder and control circuitry 862 generates either a WLR command signal or a WRR command signal at data time in response to a command to write information into the left register or right register, respectively. In addition, both signals may be generated simultaneously in response to a command to write the same data into both registers at the same time. This of course would cause the left two digits to display the same information as the right two digits. A pair of blanking flip-flops 916, 918 permit the selective blanking and unblanking of the two left and the two right hexidecimal display digits of display 852 in response to blank left (BLANK L.), unblank left (UNBLANK L.), blank right (BLANK R.), and unblank right (UNBLANK R.). commands from the command decoder control circuitry 862. These signals are generated in response to microprocessor command control signals for the proper implementation of (1) an unblank left and right command, (2) an unblank left and blank right command, (3) an unblank right and blank left command, or (4) a blank left and blank right command. Selective control of the blanking and unblanking of the two left and two right hexidecimal display digits is thus provided.

Other commands from the microprocessor which are applicable to the operator function subsystem 64 include write data to right register 914, write data to left register 912 and write data to both right register 914 and left register 912 simultaneously. These command signals cause the generation of approximate WLR and WRR signals for the gating of the bus information into the registers 912, 914 in correspondence therewith. In addition, there are several groups of four microprocessor commands, each of which command the appearance of data on the data bus 860 with this data being written into neither register 912 nor register 914, register 912 but not register 914, register 914 but not 912, or both registers 912 and 914. Only the category of commands will be discussed generally hereafter but it will be appreciated that each of the four above-described variations are applicable for each command. A write auxiliary address command causes the transfer of information appearing on the bus 860 into the memory address register 876. During the data time a store command is generated by the memory timing circuit 880 to clock the latches of address register 876 and reset latches 882 of input register in preparation for a possible subsequent write command. A write auxiliary memory data command to command decoder and control circuitry 862 appears as R/W and Memory Cycle commands to latch 878 and timing circuit 880, respectively, and causes the information appearing on data bus 860 to be latched by latches 882 and written into the memory 850 at a previously defined memory address location. A read auxiliary memory data command to 862 causes information output from a previously defined address location of memory 850 to be transferred to the data bus 860 at data time. A read data switch command signal causes the generation of signal RHDSWC at command time and signal RHDSWG at data time to gate the encoded representation of the status of switches 894 and 896 onto the data bus line 860. Similarly, a read function switch control command causes the generation signals RFSWC and RFSWG to cause the encoded output of function switch 892 to be latched during command time and to be placed on the data bus line 860 during data time.

While there has been described above a particular embodiment of a transaction execution terminal having a basic microprocessor modular control system in accordance with the invention for the purpose of enabling a person of ordinary skill in the art to make and use the invention, it will be appreciated that the invention is not limited thereto. Accordingly, any modification, variation or equivalent arrangement within the scope of the attached claims should be considered to be within the scope of the invention.

What is claimed is:

1. A flexible, modular transaction execution terminal comprising:
   an information bus for carrying data signals and bus access control signals which control the transfer of bus data signals between the bus and an adapter unit connected to the bus;

a programmable processor unit connected to the bus, the processor unit including program storage and electrically alterable random access storage operable under control of program information to generate data signals on the bus for commanding an adapter unit to perform a specific operation, to receive data information from the bus, and to generate bus control signals;

a document handling system connected to the information bus, the document handling system including storage for a plurality of issuable articles, an issue port, a transport mechanism for selectively conveying issuable documents from storage to the issue port, and control circuitry connected to control a plurality of issue system operations with pertain to the issuance of a document in response to data signals received from the bus, the control circuitry further generating document issue subsystem status information for communication as a bus data signal upon command; and a user communication sybsystem including means for receiving information from a user, and means for conveying information messages to a user, the user communication subsystem including control circuitry connected to control a plurality of communication subsystem operations which pertain to the conveyance of an information message to a user in response to bus data signals and connected to generate user communication subsystem status information indicative of information received from a user for communication as a bus data signal upon command.

2. A modular system for executing a user requested financial transaction in a transaction cycle comprising:

an information bus;

a programmable processor including processor program storage and random access electrically alterable storage, the processor operating under program control to respond to information received over the bus by sequentially generating a plurality of subsystem commands for each transaction cycle, each commanding a selected subsystem module to unconditionally perform a specific basic function pertaining to the execution of a transaction cycle, the sequential commands being communicated over the bus to selected subsystem modules;

a plurality of subsystem modules connected for communication over the information bus, each subsystem module collecting and providing to the bus, system status information on a plurality of system conditions, and each subsystem module unconditionally performing specific base functions pertaining to the execution of a transaction cycle in response to commands received over the bus, the execution of a plurality of different basic functions being required for the execution of a transaction cycle.

3. A transaction execution terminal for financial transactions comprising:

a terminal information bus carrying subsystem identifying address signals, data transfer signals, subsystem control data signals and terminal data signals;

a programmable data processor connected to control the operation of the terminal by means of the transfer of terminal information along the terminal information bus; and at least one subsystem connected for communication via the terminal information bus, said subsystem being incapable of making any decision with respect to a terminal function and including interface circuitry connected to receive and generate data transfer signals to control the transfer to terminal data signals and subsystem control data signals between the terminal information bus and subsystem only in response to a terminal information bus address signal identifying the subsystem, terminal control circuitry connected to execute a plurality of terminal functions in response to subsystem control data received thereby, each terminal function being executed in response to different system control data and execution of a plurality of terminal functions being required for execution of a transaction; and terminal status circuitry connected to generate terminal data signals indicative of terminal status conditions.

4. A transaction execution terminal for financial transactions comprising:

a terminal information bus carrying data signals and data transfer control signals between elements which are connected to the bus;

a programmable data processor connected to the bus, the data processor being operable under program control to selectively transfer data over the terminal information bus to and from selected subsystems connected thereto to respectively provide detailed control over the starting and stopping of elementary terminal functions and receive information indicative of terminal status conditions; and at least one subsystem connected to the terminal information bus, said subsystem including a subsystem bus, interface circuitry connected to receive and generate data transfer control signals to transfer data signals from the terminal information bus to the subsystem bus and from the subsystem bus to the terminal bus, at least one data storage element, an operative device which is connected to operate in response to the data content of the data storage element to perform a plurality of different elemental system functions, a plurality of which are required for execution of a financial transaction, circuitry responsive to the status of the operative device connected to generate at least one status signal indicative thereof, and control circuitry responsive to a portion of the data signals appearing on the subsystem bus to selectively control the writing of other subsystem bus data signals into said at least one storage element and to selectively control the transfer of said at least one status signal into the subsystem bus.

5. The transaction execution terminal as set forth in claim 4 above, wherein at least one subsystem is a mechanical control subsystem having a plurality of data storage elements which is operable to issue documents and transport a user card past a read head in response to information contained in the data storage elements.

6. The transaction execution terminal as set forth in claim 5 above, further comprising a second subsystem having a plurality of data storage elements which includes user display and which is operable to control the information displayed by said display in response to information contained in the data storage registers.

7. A transaction execution terminal which is operable to receive and execute user requested transactions, the terminal comprising:

a terminal data bus;

a programmable data processing subsystem connected for bidirectional communication over the data bus;

a mechanical control subsystem connected to communicate bidirectionally over the data bus and including a first plurality of data storage elements, a plurality of current drivers, each driver being connected to be turned on and off in response to a data storage state of a different data storage element, and each driver having an output which is connected through a relatively high impedance to a voltage source and connectable to a relatively low impedance load, means responsive to the driver outputs for detecting when all drivers are in a predetermined driving status and generating an output signal indicative of the detected status, a second plurality of data storage elements, one of which is responsive to the status indicative output signal, and means responsive to control information appearing on the terminal data bus for selectively loading data appearing on the data bus into the first plurality of data storage elements and selectively driving data bus data lines in accordance with information stored by the second plurality of data storage elements; and a document issue mechanism coupled to selectively issue documents to terminal users in response to at least one of the drivers.

8. The transaction execution terminal as set forth in claim 7 above, further comprising a second document issue mechanism coupled to selectively issue documents to terminal users in response to at least one of the drivers.

9. The transaction execution terminal as set forth in claim 8 above, further comprising a third document issue mechanism coupled to selectively issue documents to terminal users in response to at least one of the drivers.

10. The transaction execution terminal as set forth in claim 9 above, wherein the first document issue mechanism is a cash issue mechanism and wherein the second document issue mechanism is a transaction statement mechanism and includes a printer for selectively printing information on transaction statement forms.

11. The transaction execution terminal as set forth in claim 7 above, wherein each driver includes a transistor having a common emitter and a collector which is connectable to a low impedance load.

12. The transaction execution terminal as set forth in claim 7, above, wherein the data processing system is arranged to access a predetermined instruction location in response to a terminal reset command and further comprising means for sensing a substantial power loss and generating a terminal reset signal for a predetermined period of time after restoration of powder following a power loss.

13. In a transaction terminal which is operable to dispense cash and execute other transactions in response to user requests, a driver wrap test circuit comprising a plurality of current drivres which are connectable to control the energization of electromechanical transducers in response to the data states of data storage elements corresponding thereto; a detection circuit connected to detect and indicate the simultaneous turn-on of all drivers; and means for testing the operability of the drivers to turn on and turn off by first loading information into said storage elements to turn on all drivers and sampling the detection circuit indication to test the ability of all drivers to turn on and then loading information into said storage elements to selectively turn off said drivers with only one driver off at a time and sampling the detection circuit indication to test for the failure of said one driver to turn off, said drivers being turned on and off sufficiently fast that the electromechanical transducers connected thereto are unable to respond to the turning on and turning off of drivers during the driver wrap test.

14. The driver wrap test circuit as set forth in claim 13 above wherein the drivers include common emitter connected driver transistors, each having the collector thereof connectable to an electromechanical transducer and a plurality of common cathode connected diodes, each having the anode thereof coupled to the collector of a different driver transistor.

15. The driver wrap test circuit as set forth in claim 14 above further comprising a plurality of impedances, each having a resistance of at least 500 ohms and each being connected between the collector of a different driver transistor and a voltage source.

16. A cash issue transaction execution terminal comprising:

a terminal data bus;

a plurality of terminal subsystems, each being connected to communicate with a programmable control subsystem via the data bus and being operable to execute terminal functions in response to information from the control subsystem and to accumulate information on the status of controlled functions for communication to the control subsystem;

a programmable control subsystem which is operable to communicate with other terminal subsystems via the terminal data bus to control terminal operations, the control subsystem being operable to access a predetermined instruction location in response to a terminal reset command; and circuitry connected to detect irregular terminal conditions which indicate the inability of the control subsystem to properly execute instructions and generate a terminal reset signal in response to the detection of at least one of said irregular terminal conditions.

17. The cash issue transaction execution terminal as set forth in claim 16 above, wherein the detection circuitry includes a circuit for detecting an absence of control subsystem activity for a predetermined period of time.

18. The cash issue transaction execution terminal as set forth in claim 17 above, wherein the detection circuitry includes a power sense circuit connected to sense a utility power interruption of at least a predetermined duration and generate a terminal reset signal after a predetermined delay following said power interruption detection.

19. The cash issue transaction execution terminal as set forth in claim 18 above, further comprising a power out protected memory connected for communication with the control subsystem, and wherein the power sense circuit further comprises circuitry for communicating a power out warning signal to the control subsystem upon detection of a predetermined duration power interruption and circuitry for disabling changes in the information content of the protected memory after a period of time following the generation of the power out warning signal sufficient to permit the storage of critical terminal operating parameters in the protected memory by the control subsystem.

20. A terminal for executing transactions requested by a terminal user comprising:
- a terminal information bus connected to provide communicating between terminal subsystems;
- a data processing subsystem coupled to the terminal information bus which is operable to receive terminal status information from other subsystems connected to the bus, generate terminal control information signals for specifically and unconditionally controlling the energization of electromechanical transducers, and to communicate the terminal control informatiaon signals to selected terminal subsystems;
- a mechanical control subsystem coupled to the terminal bus including (1) a mechanical control write register having a plurality of bit positions which are coupled to receive terminal control information signals when selected by the data processing subsystem, (2) a document handling subsystem including (2a) a document feed mechanism connected to feed a single document to a stacking position along an escrow path each time a predetermined information state is written into a document feed bit position within the mechanical control write register, and (2b) an escrow transport mechanism disposed to transport documents along an escrow path which extends to a document issue port, the transport mechanism being coupled to transport documents in accordance with the energization of an escrow transport motor which is energized and deenergized in response to the information state of an escrow transport motor on/off bit position in the mechanical control write register with the direction of rotation determined in response to the information state of an escrow transport motor direction bit position in the mechanical control write register, (3) a card transport mechanism disposed to receive a user card and transport the user card along a card path which passes adjacent a read head for reading information from the card, the transport mechanism including a drive motor which is started and stopped in response to an information state of a card transport motor on/off bit position in the mechanical control write register with the direction of motor operation being controlled in response to an information state of a card motor direction bit position in the mechanical control write register, and (4) mechanical control status sensing circuitry connected to collect mechanical control status information on the position of a document within said document feed mechanism and escrow transport mechanism and on the position of a card within said card transport mechanism and communicate the collected mechanical control status information to the data processing subsystem; and
- a user communication subsystem coupled to the terminal information bus including means for interactive communication with a terminal user.

* * * * *

UNITED STATES PATENT AND TRADEMARK OFFICE
CERTIFICATE OF CORRECTION

PATENT NO. : 3,937,925
DATED : February 10, 1976
INVENTOR(S) : William A. Boothroyd It is certified that error appears in the above-identified patent and that said Letters Patent are hereby corrected as shown below:

Col. 33, line 4, after "storage" and before "opera-" insert --and being--; line 16, after "operations" and before "per-", "with" should read --which--; line 22, "sybsystem" should read --subsystem--; line 53, "base" should read --basic--. Col. 34, line 6, "to" (second occurrence) should read --of--; line 17, after "transaction" the semicolon (";") should read a comma (","). Col. 35, line 56, "powder" should read --power--; line 61, "drivres" should read --drivers--. Col. 37, line 13, "informatiaon" should read --information--.

Signed and Sealed this eleventh Day of May 1976

[SEAL]

Attest:

RUTH C. MASON
Attesting Officer

C. MARSHALL DANN
Commissioner of Patents and Trademarks